United States Patent
Wing et al.

(10) Patent No.: US 10,324,773 B2
(45) Date of Patent: Jun. 18, 2019

(54) PROCESSING EVENTS GENERATED BY INTERNET OF THINGS (IOT)

(71) Applicant: salesforce.com, inc., San Francisco, CA (US)

(72) Inventors: Aubrey Wing, Los Altos, CA (US); Tatyana Mamut, San Francisco, CA (US); Arthur Ping-Tak Che, San Francisco, CA (US); Tiffany Joy Chin, San Mateo, CA (US); Amy Kar Sin Poon, Pleasanton, CA (US); Andrew Layman, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 427 days.

(21) Appl. No.: 15/089,097

(22) Filed: Apr. 1, 2016

(65) Prior Publication Data
US 2017/0083386 A1    Mar. 23, 2017

Related U.S. Application Data

(63) Continuation-in-part of application No. 14/936,141, filed on Nov. 9, 2015.
(Continued)

(51) Int. Cl.
*G06F 3/048* (2013.01)
*G06F 9/54* (2006.01)
*G06F 1/3212* (2019.01)

(52) U.S. Cl.
CPC ............ *G06F 9/542* (2013.01); *G06F 1/3212* (2013.01)

(58) Field of Classification Search
CPC .............................. G06F 9/542; G06F 1/3212
(Continued)

(56) References Cited

U.S. PATENT DOCUMENTS 5,577,188 A    11/1996  Zhu
5,608,872 A    3/1997   Schwartz et al.
(Continued)

OTHER PUBLICATIONS

Boykin, et al., "Summingbird: A Framework for Integrating Batch and Online MapReduce Computations," Twitter, Inc., Proceedings of the VLDB Endowment, vol. 7, No. 13, (2014) pp. 1441-1451.
(Continued)

*Primary Examiner* — David Phantana-angkool
(74) *Attorney, Agent, or Firm* — Sterne, Kessler, Goldstein & Fox P.L.L.C.

(57) ABSTRACT

The technology disclosed relates to processing events generated by Internet of Things (IoT) devices. In particular, it relates to storing a machine-readable declarative specification of stateful event processing of an automated multi-step progression of monitoring of Internet of Things (IoT) devices that generate events. It includes compiling into tangible memory, in response to the declarative specification, a state processing network that implements a multi-step progression of monitoring events generated by the IoT devices. The state processing network implements both the time based transition triggers and the event based transition triggers after being initiated by the IoT devices. Further, data structures, which record monitoring status of particular IoT devices, are compiled. Finally, the state processing network further selects an alternative action to trigger, and triggers the selected action using at least some data from a particular event being processed.

17 Claims, 26 Drawing Sheets

Related U.S. Application Data

(60) Provisional application No. 62/220,811, filed on Sep. 18, 2015, provisional application No. 62/220,132, filed on Sep. 17, 2015, provisional application No. 62/220,137, filed on Sep. 17, 2015.

(58) Field of Classification Search
USPC .......................................................... 715/810
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,619,143 B2* | 4/2017 | Herz .................... G06F 3/04817 |
| 9,645,864 B2* | 5/2017 | Rothman ................ G06F 9/542 |
| 9,836,189 B2* | 12/2017 | Clayton .................. G06F 9/542 |
| 9,882,912 B2* | 1/2018 | Joo .......................... H04L 63/08 |
| 9,917,903 B2* | 3/2018 | Clernon .................. H04W 4/70 |
| 10,025,656 B2* | 7/2018 | Hosabettu ............. G06F 11/079 |
| 10,057,264 B1* | 8/2018 | ElNakib ............. H04L 63/0876 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1* | 10/2002 | Brodersen ............ G05B 19/042 |
| | | 705/7.11 |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1* | 9/2004 | Lee ........................ G06F 9/542 |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2016/0162582 A1* | 6/2016 | Chatterjee ......... G06F 17/30867 707/706 |
| 2016/0335260 A1* | 11/2016 | Convertino ......... G06F 17/3053 |
| 2017/0083386 A1* | 3/2017 | Wing ...................... G06F 9/542 |
| 2017/0155703 A1* | 6/2017 | Hao ........................ H04L 67/12 |
| 2017/0329653 A9* | 11/2017 | Li ..................... G06F 17/30867 |

OTHER PUBLICATIONS

"Thingsee Engine API" Version 01.000, Mar. 7, 2015, (2015), retrieved Feb. 4, 2016, <https://thingsee.zendesk.com/hc/en-us/articles/205263911-Thingsee-Engine-API-Introduction> pp. 1-24.

* cited by examiner

FIG. 4A

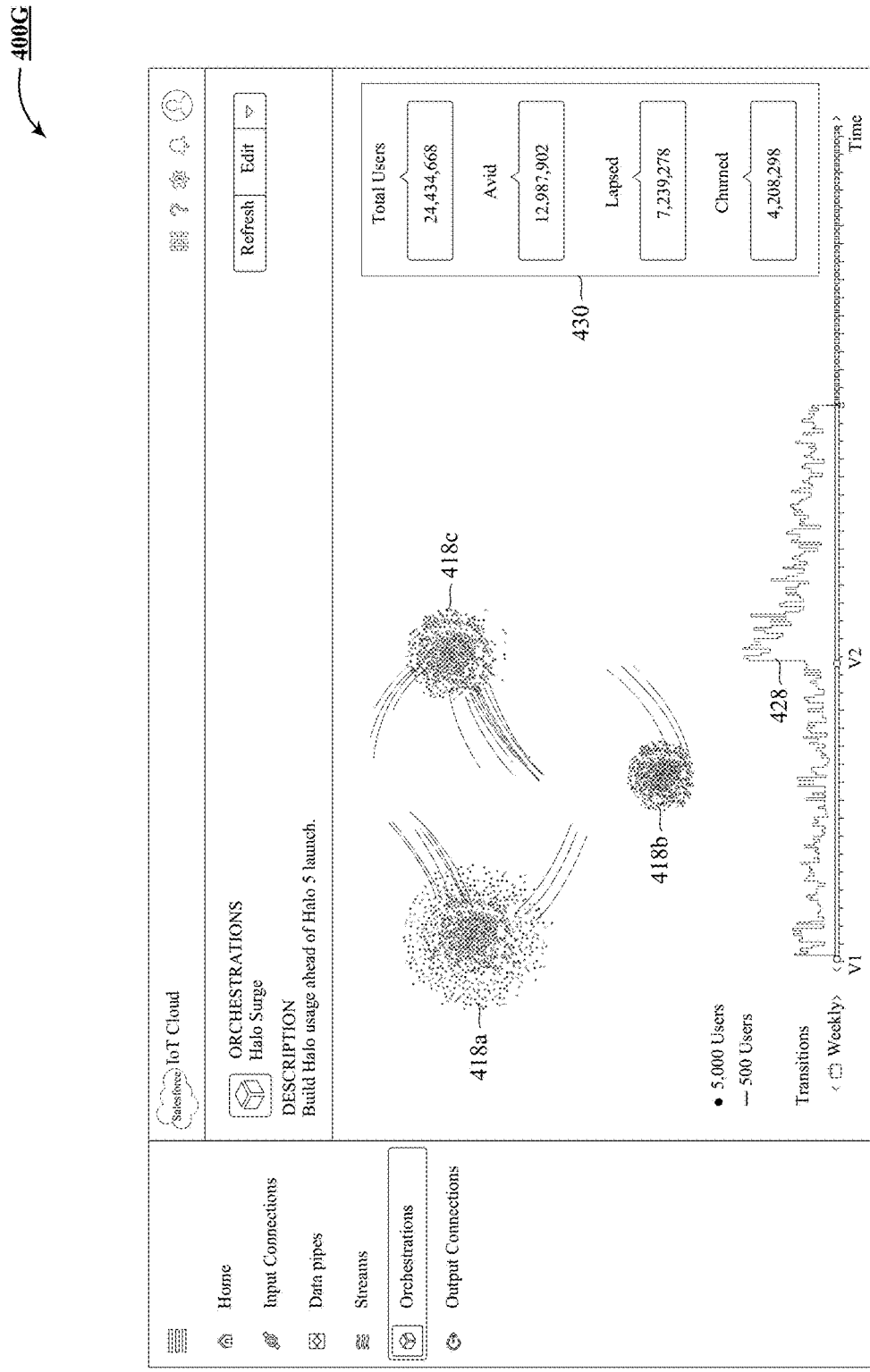

UC1:UPS Battery Condition

Pilot-Schneider-1a-Min  schneider-pioft-devorg@sfdcnow.com

Save | Deploy

RULES    GLOBAL RULES    VARIABLES

| | Event Type | IF | Action | Description |
|---|---|---|---|---|
| Default | UPS | | Change state to Normal | |

| | When/Event Type | IF | Action | Description |
|---|---|---|---|---|
| Normal | ⊞ UPS | UPS.Battery_Status != "Normal" && (Profile.warranty_end_date - Expiry_Window < TODAY()) | Create Case in Schneider Devorg | Battery at risk and warranty within Expiry Window, create Case in Service Cloud and ServiceMAX |
| | | | Send Message to UPS Location Stream | Battery at risk and warranty within Expiry Window, create Warranty Upsell Opportunity |
| | | | Change state to Battery Not Normal - Warranty Expiring | Battery at risk and warranty within Expiry Window, change state to Battery Not Normal - Warranty Expiring |
| | | UPS.Battery_Status != "Normal" && (Profile.warranty_end_date - Expiry_Window < TODAY()) | Create Case in Schneider Devorg | Battery at risk and warranty outside Expiry Window, create Warranty Upsell Opportunity |
| | | | Change state to Battery Not Normal - Warranty OK | Battery at risk and warranty within Expiry Window, change state to Battery Not Normal - Warranty Expiring |

| | When/Event Type | IF | Action | Description |
|---|---|---|---|---|
| Battery Not Normal ⊞ - Warranty Expiring | UPS | UPS.Battery_Status = "Normal" | Update Case in Schneider Devorg | If Status is Normal, close Service Case |
| | | | Change state to Normal | If Status is Normal, change state to Normal |

| | When/Event Type | IF | Action | Description |
|---|---|---|---|---|
| Battery Not Normal ⊞ - Warranty OK | UPS | UPS.Battery_Status = "Normal" | Update Case in Schneider Devorg | If Status is Normal, close Service Case |
| | | | Update Opportunity in Schneider Devorg | If Status is Normal, Update Opportunity |
| | | | Change state to Normal | If Status is Normal, change to Normal |

⊕ Add State

| RULES | GLOBAL RULES | VARIABLES | | | |
|---|---|---|---|---|---|
| Name | Event Type | IF | Value | Initial Value | Description |
| Max_Voltage_Threshold | --- | | --- | 115 | Voltage considered to be overload |
| Allowable_Overloads | --- | | --- | 7 | # times overload before Service required |
| Spike_Count | UPS | UPS.Battery_Voltage > Max_Voltage_Thershold | Count 7 days | | Count Overloads for 7 days |
| Rolling_Overload_Count | UPS | UPS.Battery_Voltage > Max_Voltage_Thershold | Count 7 days | | # days overload occured |
| CaseID | --- | | --- | | Case ID from Service Cloud |
| OpportunityID | --- | | --- | | OpportunityID from Sales Cloud |
| Warranty_Notification | --- | | --- | 30 | Days before end foe warranty to begin notification |
| CaseStatus | UPS | | --- | | Assumes Charlie's deployment ofSFDC data back to Input Stream |
| CaseSLA | --- | | --- | 5 | Days case can be open before escalation |
| High_Overloads | --- | | --- | 20 | # times overload before UpsellOpportunity |

+ Add Variable

🔵 IoT cloud     Pilot-Schneider-1a-Mm ▽    ⚙ schneider-piolt-devorg@sfdcnow.com

UC3:UPS Grouped Opportunity        [ Save ] [ Deploy ] ▽

RULES    GLOBAL RULES    VARIABLES

| Name | Event Type | IF | Action | Description |
|---|---|---|---|---|
| Default | ⊞ BatteryCondition ▽ | | Change state to Evaluation | ▽ |
| | Overload ▽ | | Change state to Evaluation | ▽ |
| | When/Event Type | IF | Action | Description |
| ⬧ Evaluation | ⊞ ✉BatteryCondition▽ | IF BatteryEvents + OverloadEvents >= 10 | OpptyID =NULLVALUE | ▽ Event comes in, check to see if I have 10 or more total Battery or Overload events. If so, reset OpportunityID |
| | | | Change state to Create Opportunity | ▽ Change state to Create Opportunity to create opportunity in Sales Cloud |
| | ✉Overload ▽ | | OpptyID =NULLVALUE | ▽ vent comes in, check to see if I have 10 or more total Battery or Overload events. If so, reset OpportunityID |
| | | | Change state to Create Opportunity | ▽ Change state to Create opportunity to create opportunity in Sales Cloud |
| | ⊕Day31 ▽ | | OpptyID =NULLVALUE | ▽ After 30 days, rest OpptyID variable to capture and create new opportunities for the new time period (Day1 = Immediately, can be adjusted to longer or shorter depending on grouping preference) |

| RULES | GLOBAL RULES | VARIABLES | | |
|---|---|---|---|---|
| | When/Event Type | IF | Action | Description |
| ◇ Create Opportunity ⊕ | ⊟ Overload | ISBLANK(OpptyID) == true | Create Opportunity in Schneider Devorg | Create opportunity in Sales Cloud by Location ▷ |
| | | | Change state to Waiting for Opportunity | After opportunity is attempted, change state to wait for response ▷ |
| | | ISBLANK(OpptyID) != true | Change state to Append Opportunity | If opportunity already exists, change state to Append Opportunity to append new information to existing opportunity for each location ▷ |
| | ⊟ BatteryCondition ▷ | ISBLANK(OpptyID) == true | Create Opportunity in Schneider Devorg | Create Opportunity in Sales Cloud by Location ▷ |
| | | | Change state to Waiting for Opportunity | After opportunity is attempted, change state to wait for response ▷ |
| | | ISBLANK(OpptyID) != true | Change state to Append Opportunity | If opportunity already exists, change state to Append Opportunity to append new information to existing opportunity for each location ▷ |
| | When/Event Type | IF | Action | Description |
| ◇ Waiting for Opportunity ⊕ | ⇔ opptyResponse ▷ | opptyResponse.isSuccess == true | OpptyID =opptyResponse.ID | Record Oppty ID. This state exists to make sure new events don't change state prior to response from SFDC. ▷ |
| | | | Change state to Append Opportunity | If opportunity already exists, change state to Append Opportunity to append new information to existing opportunity for each location ▷ |
| | | opptyResponse.isSuccess == false | Change state to Evaluation | Timeout or other fault, go back to Evaulation state and try again on next event ▷ |

| RULES | GLOBAL RULES | VARIABLES | | | |
|---|---|---|---|---|---|
| | When/Event Type | IF | | Action | Description |
| ◇ Append Opportunity ⊞ | ☑ Overload | ◇ | ISBLANK(OpptyID) = false | Update Opportunity in Schneider Devorg | ◇ Update using different fields for different types of opportunities. Leverage append / process builder |
| | | | | Change state to Evaluation | ◇ Change state to Evaluation after appending opportunity data in Sales Cloud to prepare for any subsequent events by location |
| | ☑ BatteryCondition ◇ | | | Update Opportunity in Schneider Devorg | ◇ Update using different fields for different types of opportunities. Leverage append / process builder |
| | | | | Change state to Evaluation | ◇ Change state to Evaluation after appending opportunity data in Sales Cloud to prepare for any subsequent events by location |

| | | | | Pilot-Schneider-1a-Min ▽ | 🕸 schneider-piolt-devorg@sfdcuow.com |
|---|---|---|---|---|---|
| | | | | | Save Deploy ▽ |

Salesforce IoT cloud

UC3:UPS Grouped Opportunity

RULES    GLOBAL RULES    VARIABLES

| Name | Event Type | IF | Value | Initial Value | Description |
|---|---|---|---|---|---|
| OpptyID | A value is assigned to this variable in an action below. | | | | |
| BatteryEvents | BatteryCondition ▽ | | Count 365 days ▽ | | How many Battery Events in 1 year |
| OverloadEvents | Overload ▽ | | Count 365 days ▽ | | How many Overload Events in 1 year |

✦ Add Variable

| RULES | GLOBAL RULES | | VARIABLES | | |
|---|---|---|---|---|---|
| Name | Event Type | | IF | Action | Description |
| Default | ⊞ update | ▽ | | Change state to Normal | ▽ |
| | online | ▽ | | Change state to Normal | Device comes online, change state to Normal and check WiFi quality ▽ |
| | offline | ▽ | | Change state to Offline | Device goes offline, change state to Offline and monitor ▽ |
| | When/Event Type | | IF | Action | Description |
| ⊕ Normal | ☑ update | ▽ | wifi_connection_quality < wifi_threshold | Change state to Low WiFi | Change to Low Wifi if connection quality < 25 ▽ |
| | ☑ offline | ▽ | | Change state to Offline | If device offline, change state ▽ |
| | When/Event Type | | IF | Action | Description |
| ⊕ Low WiFi | ☑ update | ▽ | wifi_connection_quality > wifi_threshold | Change state to Normal | If Wifi above ▽ |
| | ⊙ Hour 2 | ▽ | avg_wifi_connection_quality > 0 && avg_wifi_connection_quality < wifi_threshold | Send Message to Sensi Orchestration Stream | Notify when WiFi low for 2 hours ▽ |
| | | | avg_wifi_connection_quality > wifi_threshold | Change state to Normal | If low Wifi does not continue, changes state to normal and monitor ▽ |
| | ⊙ Day 2 | ▽ | avg_wifi_connection_quality > 0 && avg_wifi_connection_quality < wifi_threshold | Create Case in Emerson Pilot Devorgs | If wifi low for 2 days, auto-create case ▽ |
| | When/Event Type | | IF | Action | Description |
| ⊕ Offline | ☑ offline | ▽ | | Send Message to Sensi Orchestration Stream | Device offline, send message ▽ |
| | ☑ offline | ▽ | | Change state to Normal | Device back online, change state to Normal ▽ |
| ⊕ Add State | | | | | |

| RULES | GLOBAL RULES | VARIABLES | | |
|---|---|---|---|---|
| | When/Event Type | IF | Action | Description |
| Always | ⊗ ☑ Update | ▽ wifi_connection_quality > 25 | Change state to Normal | ▽ Change state to Normal if WiFi >25 |

| RULES | GLOBAL RULES | VARIABLES | | | Current Wifi Connection Quality |
|---|---|---|---|---|---|
| Name | Event Type | IF | Value | Initial Value | Description |
| wifi_connection_quality | update | ▽ | | ▽ | 🗑 |
| avg_wifi_connection_quality | update | ▽ | update.operational_status.Avg wifi_connection_quality over 2 hours | ▽ | Average Wifi Connection Quality over 2 hours | 🗑 |
| wifi_threshold | --- | ▽ | --- | ▽ 25 | Lowest wifi quality allowable before considered | 🗑 |
| ✢ Add Variable | | | | | |

FIG. 16C

PROCESSING EVENTS GENERATED BY INTERNET OF THINGS (IOT)

PRIORITY APPLICATION

This application is a continuation-in-part of U.S. patent application Ser. No. 14/936,141, entitled "SIMPLIFIED ENTITY LIFECYCLE MANAGEMENT" filed on Nov. 9, 2015, which claims the benefit of U.S. Provisional Patent Application No. 62/220,132, "SIMPLIFIED ENTITY LIFECYCLE MANAGEMENT" filed on Sep. 17, 2015 and US Provisional Patent Application No. 62/220,137, "SIMPLIFIED ENTITY ENGAGEMENT AUTOMATION" filed on Sep. 17, 2015. Further, this application claims the benefit of U.S. Provisional Patent Application 62/220,811, "SUB-SECOND RESPONSES TO COMPLEX ANALYTICAL QUERIES USING COMBINATION OF BATCH AND STREAM PROCESSING" filed on Sep. 18, 2015. Each of these applications is hereby incorporated by reference for all purposes.

RELATED APPLICATIONS

This application is related to U.S. patent application Ser. No. 14/931,658, entitled "SIMPLIFIED ENTITY ENGAGEMENT AUTOMATION" filed on Nov. 3, 2015. The related application is hereby incorporated by reference for all purposes.

FIELD OF THE TECHNOLOGY DISCLOSED

The technology disclosed relates generally to a processing framework for stream processing systems, and in particular to providing an improved stream processing framework that uses a combination of concurrent and multiplexed processing.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

For many analytic solutions, batch processing systems are not sufficient for providing real-time results because of their loading and processing requirements that can take hours to run batch jobs. As a result, analytics on events can only be generated long after the events have occurred. In contrast, the shortcoming of streaming processing analytics systems is that they do not always provide the level of accuracy and completeness that batch processing systems provide. The technology disclosed uses a combination of batch and streaming processing modes to deliver contextual responses to complex analytics queries with low-latency on a real-time basis.

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are present in areas likes smart cities (regions), smart car and mobility, smart home and assisted living, smart industries, public safety, energy and environmental protection, agriculture and tourism.

Currently, there is a need to make such IoT applications/services more accessible to non-experts. Till now, non-experts who have highly valuable non-technical domain knowledge have cheered from the sidelines of the IoT ecosystem because of the IoT ecosystem's reliance on tech-heavy products that require substantial programming experience. Thus, it has become imperative to increase the non-experts' ability to independently combine and harness big data computing and analytics without reliance on expensive technical consultants.

Stream processing is quickly becoming a crucial component of Big Data processing solutions for enterprises, with many popular open-source stream processing systems available today, including Apache Storm™, Apache Spark™, Apache Samza™, Apache Flink™, and others. Many of these stream processing solutions offer default schedulers that evenly distribute processing tasks between the available computation resources using a round-robin strategy. However, such a strategy is not cost effective because substantial computation time and resources are lost during assignment and re-assignment of tasks to the correct sequence of computation resources in the stream processing system, thereby introducing significant latency in the system.

Also, an opportunity arises to provide systems and methods that use simple and easily codable declarative language based solutions to execute big data computing and analytics tasks.

Further, an opportunity arises to provide systems and methods that use a combination of concurrent and multiplexed processing schemes to adapt to the varying computational requirements and availability in a stream processing system with little performance loss or added complexity. Increased revenue, higher user retention, improved user engagement and experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed relates to processing events generated by Internet of Things (IoT) devices. In particular, it relates to storing a machine-readable declarative specification of stateful event processing of an automated multi-step progression of monitoring of Internet of Things (IoT) devices that generate events. It includes compiling into tangible memory, in response to the declarative specification, a state processing network that implements a multi-step progression of monitoring events generated by the IoT devices. The state processing network implements both the time based transition triggers and the event based transition triggers after being initiated by the IoT devices. Further, data structures, which record monitoring status of particular IoT devices, are compiled. Finally, the state processing network further selects an alternative action to trigger, and triggers the selected action using at least some data from a particular event being processed.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 4A, FIG. 4B and FIG. 4C show date entry columnar examples for accepting declarative inputs to create the state processing network illustrated in FIG. 3.

FIG. 4G illustrates one implementation of state morphing using a replay control that visualizes transition of entities among the state types.

FIG. 10 shows one implementation of a state processing network for managing smart uninterruptible power supply (UPS) devices based on a battery parameter.

FIG. 13 is one implementation of a state processing network for managing smart uninterruptible power supply (UPS) devices based on battery and voltage parameters and connecting monitoring of the smart UPS devices to a CRM platform.

FIGS. 14A, 14B and 14C depict one implementation of a state processing network for managing smart uninterruptible power supply (UPS) devices based on battery and voltage parameters and connecting monitoring of the smart UPS devices to a CRM platform using time based triggers.

FIG. 15 shows one implementation of a state processing network for managing smart uninterruptible power supply (UPS) devices over a time duration based on battery and voltage parameters.

FIGS. 16A, 16B and 16C illustrate one implementation of a state processing network for managing smart uninterruptible power supply (UPS) devices based on WiFi voltage parameter and connecting monitoring of the smart UPS devices to a CRM platform.

DETAILED DESCRIPTION

Figure 1A:
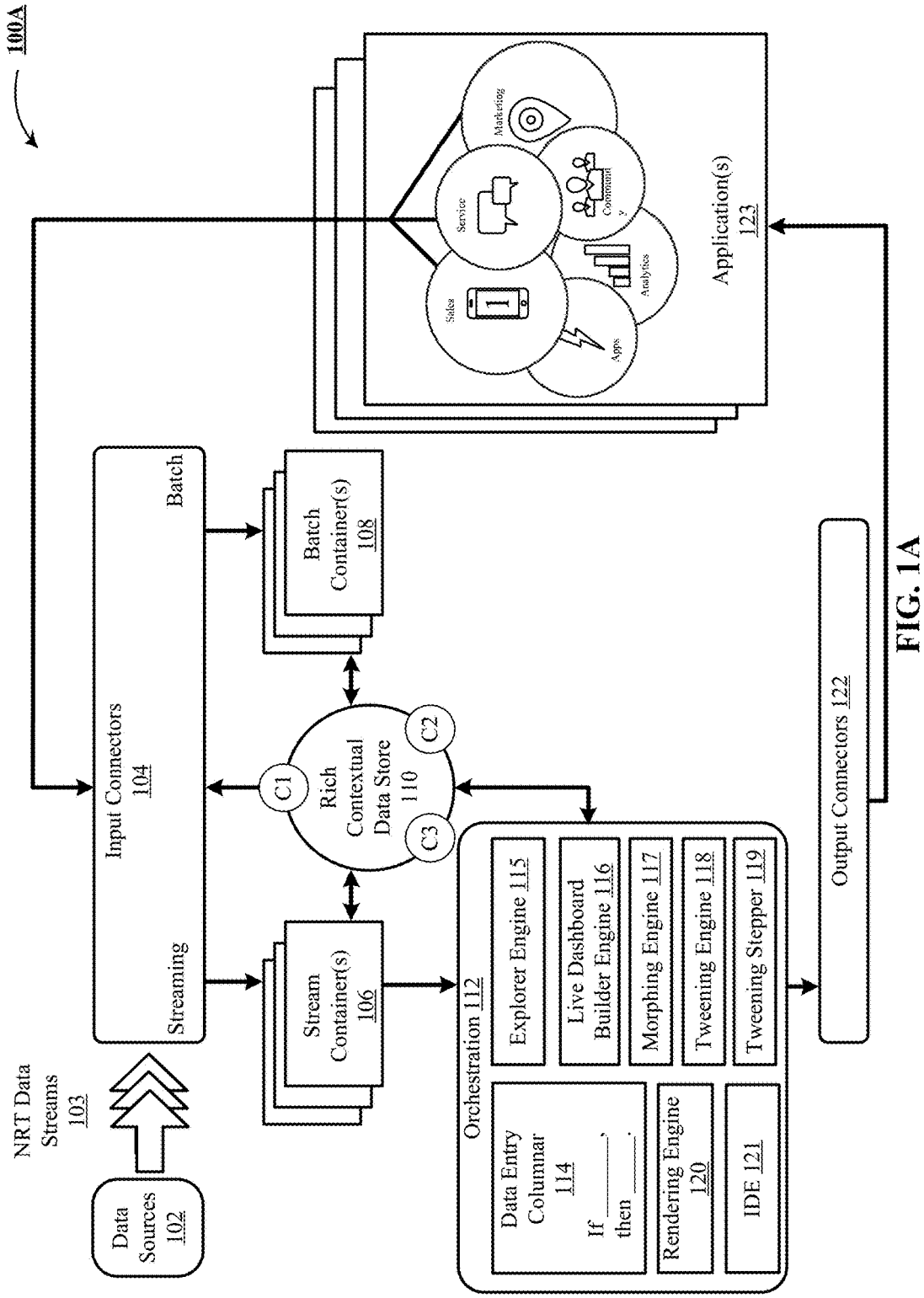
FIG. 1A depicts an exemplary IoT platform.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an explanation of terminology that will be used throughout the discussion is provided, followed by an introduction describing some of the technical problems addressed and technical solutions offered by various implementations. Then, a high-level description of some implementations will be discussed at an architectural level. Also, a state processing network implementing an entity management workflow is described. Further, some user interface views used by some implementations will be presented. Next, more focused actions for implementing the system, together with data entry models, transitive triggers and condition definitions are discussed. Lastly, some particular implementations are discussed.

Terminology

Task Sequence: A "task sequence" is defined as a designed effort or process, usually implemented by an experience operator (e.g. company, organization), to enable effective user management and resource provisioning, application life cycle management, workflow implementation, user engagement, traffic monitoring, activity tracking, provisioning for application modeling, etc. A task sequence involves collection of data from a large number of entities and subsequent processing of the collected data. Data for a tasks sequence are received as continuous near real-time (NRT) data streams, which are processed to generate real-time analytics. In one illustrative example, a task sequence is a ride delivery workflow set up by a cab sharing company like Uber™. The ride delivery workflow can involve multiple stages, such as (1) receiving a cab request from an end-user, (2) identifying the requested destination area, (3) discovering available Uber cab drivers in the destination area, (4) transmitting the cab request with contact information of the end-user to the available Uber cab drivers, (5) receiving ratification from at least one willing Uber cab driver, (6) notifying the end-user of the imminent cab arrival with cab vehicle information and (7) receiving confirmation from the end-user regarding accepting the cab delivery. Each of these seven stages involves exchange of a substantial amount data, which gets processed in real-time to generate real-time analytics. An augmentation of millions of such real-time user-requests and real-time responses applied over extended periods of time is defined as a task sequence. Other examples of a task sequence could be—receiving millions of e-mails every day for an entity operator like Microsoft™ and processing them in real-time to generate click metrics that identify which users clicked on certain web links included in the e-mails, receiving millions of requests from users of Uber™ to redeem ride discount coupons distributed by Uber™, and receiving millions of tweets about a music concert. Still another incoming data stream is populated with WebHooks: user-defined HTTP callbacks which can, for example, be triggered by some event, such as a comment being posted to a blog. This application interchangeably refers to a "task sequence" as an "entity experience operation", and vice-versa.

Near Real-Time Data Stream: A near real-time (NRT) data stream is defined as a collection of events that are registered as they are generated by an entity. In one implementation, an NRT data stream is an unbounded sequence of data tuples. In some implementations, a NRT data stream has an emission rate of one million events or tuples per second.

Long Tail Task Sequence: A "long tail task sequence" is a task sequence that consumes dedicated computing resources which, when properly sized for the beginning of the task sequence, are excessive as the task sequence tails off. An example of a long tail task sequence is the giving of fantasy football game tokens during a Super Bowl by a gaming company. Once the demand for fantasy football tapers after the Super Bowl, the use of the game tokens also decreases. As a result, the number of game token redemption requests electronically received as events also decreases. However, the gaming company still honors the unused tokens that are redeemed slowly over a long period after the Super Bowl. This extended lull characterizes a long tail task sequence because it does not require as many computation resources as does the surge during the Super Bowl, and thus token handling can be completed using fewer computational resources than initially allotted.

Container: A stream processing framework is built using an API (application programming interface) and deployed as a cluster called a "container". The container takes care of the distribution of tasks/jobs within a given infrastructure and the API is designed to handle message passing, task/job discovery and fault-tolerance. This application interchangeably refers to a "container" as a "stream container", and vice-versa. This application interchangeably refers to a "container" or a collection of containers as a "grid", and vice-versa.

Worker Node: A container groups a set of physical machines called "worker nodes".

Physical Thread: Once deployed, a container operates over of a set of so-called "physical threads". A physical thread utilizes a processor core of a worker node and runs inside a set of code processes (e.g., Java processes) that are distributed over the worker node, no more than one physical thread per core. A physical thread also carries out the logic of a set of tasks/jobs for different elements and components (e.g., emitters and transformers) of a container.

Emitter: Data enters a container through a so-called "emitter". Emitters are event tuple sources for a container and are responsible for getting the event tuples into the container. In one implementation, emitters pull event tuples from input queues. In some implementations, emitters include user-specified conversion functions, such that they consume byte strings from an input queue and forward them as tuples to downstream transformers. An emitter retrieves one or more tasks/jobs that are executed by one or more physical threads of a worker node.

Transformers: A transformer is a computation unit of a container that processes the incoming event tuples in the container and passes them to the next set of transformers downstream in the container. A transformer passes one or more tasks/jobs downstream, typically to be further transformed one or more physical threads of a worker node.

Pipeline: A pipeline is defined as a sequence of operations performed on a group of event tuples from one or more NRT data streams. In one implementation, the grouping is on a tuple-by-type basis. In another implementation, the grouping is on batch-by-batch basis. In some implementations, each pipeline is identified by a unique pipeline identifier (ID). In one implementation, multiple NRT data streams can source data to one or more pipelines. In another implementation, a NRT data stream is queued to a task sequence in a single pipeline, which in turn is processed over a single container.

Batch: A batch is defined as an assemblage of event tuples partitioned on a time-slice basis and/or a batch-size basis and sequentially queued in a pipeline. A time-slice based definition includes partitioning at least one incoming NRT data stream by its most recently received portion within a time window (e.g., one batch keeps the event tuples from the last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches. In some other implementations, each batch in a pipeline is identified by a unique batch identifier (ID).

Batch-Unit: A micro unit of work of a batch is called a batch-unit. A batch is subdivided into a set of batch units. In some implementations, different batch-units of a batch are processed in different stages at different computation units of a container, a concept referred to as "multi-stage processing". In some other implementations, a batch is transactional boundary of stream processing within a container, such a transaction is considered to be complete when a batch is completely processed and is considered incomplete when a batch overruns a time-out without all of its batch-units being processed.

Coordinator: The coordination between a pipeline that includes data to be processed and the worker nodes that process the data is carried out through a software component of the container called a "coordinator", which is in charge of distribution of tasks to the physical threads in a worker node. This application interchangeably refers to a "coordinator" as a "grid-coordinator", and vice-versa.

Scheduler: A scheduler tracks one or more pipelines in a container and communicates with the coordinator to schedule execution of batches in the container. In some implementations, a scheduler maintains the current batch stage information during multi-stage processing of a batch and communicates this information along with identification of the batch and pipeline to the coordinator. This application interchangeably refers to a "scheduler" as a "grid-scheduler", and vice-versa.

Parallelism: A container runs a user-specified number of logically parallel threads, fixed by a developer of a container. A "logically parallel threads" value specifies how many threads are to be simultaneously utilized by the container during processing of batches in a pipeline.

Near Real-Time Data Stream: A near real-time (NRT) data stream is defined as an unbounded sequence of event tuples that is processed in parallel and distributed among multiple worker nodes. In one implementation, a NRT data stream is defined as a collection of real-time events for a task sequence or a particular stage of a task sequence. In another implementation, a NRT data stream is defined as a collection of events that are registered as they are generated by an entity. In one implementation, an NRT data stream is an unbounded sequence of data tuples. In some implementations, a NRT data stream has an emission rate of one million events or tuples per second.

Stream Processing Framework: A "stream processing framework" is defined as a real-time stream processing system that represents an entire streaming application as a graph of computation. In some implementations, the stream processing framework processes NRT data streams for one or more task sequences to generate real-time analytics. This application interchangeably refers to a "stream processing framework" as a "stream processing system", and vice-versa.

Internet of Things Platform: The "Internet of Things (IoT) platform" disclosed herein is defined as an integrated environment that collects and processes a high volume of data from a plurality of entities in real-time or near real-time, often with low latency. In some instances, processing logic can be applied to the data to generate real-time or near real-time analytics. In one implementation, an IoT platform is defined as an integrated framework that utilizes computation over a combination of stream mode and batch mode to periodically generate aggregates using batch and offline analytics and substitute results from real-time data streams to generate real-time analytics by performing computational tasks like data mining, machine learning, statistical processing, predictive analytics, time series analysis, rule based processing, complex event processing, pattern detection, correlation and more. In one implementation, the IoT platform offers a high throughput of the order of processing one million tuples per second per node. In another implementation, the IoT platform offers insights to end-users in the form of rich visualization, using GUI and/or API based tools like standard graphs, bars, charts and overlaid infographics.

Event: An event is any identifiable unit of data that conveys information about an occurrence. In one implementation, an event can also provide information concerning an entity. An event can have three aspects: a timestamp indicating when the event occurred; a set of dimensions indicating various attributes about the event; and a set of metrics related to the event. Events can be user-generated events such as keystrokes and mouse clicks, among a wide variety of other possibilities. System-generated events include statistics (e.g. latency/number of bytes, etc.), program loading and errors, also among a wide variety of other possibilities. In one implementation, events include network flow variables, device information, user and group information, information on an application (e.g., resource condition, variables and custom triggered events). An event typically represents some message, token, count, pattern, value, or marker that can be recognized within a NRT data stream, such as network traffic, specific error conditions or signals, thresholds crossed, counts accumulated, and so on. A typical user interaction with an application like Pardot™ processes a sequence of events that occur in the context of a session. The main events of note are (a) login—provide user credentials to hosted service to authenticate the user; (b) application transactions—execute a set of application level transactions, e.g. add leads or define new operations; and (c) log-out—this event terminates the session with the server. In some implementations, deep packet inspection logic tracks raw event data to identify events and stores them in an event repository. This application, in some implementations, interchangeably refers to "events" as "data", and vice-versa. Other examples of events generated by or about various entities include telemetry from a wearable sensor, data from a smart watch, data and/or metadata generated by a user using a feature of an application (such as Microsoft Word™), trip or journey data generated from a GPS used by a driver starting or completing a trip, data generated by a vehicle reporting speed or location information, data generated by a medical device reporting a sensor reading, etc.

Entity: An entity is defined as a thing or object that interacts and communicates with other things or objects and with the environment by exchanging data and information sensed about the environment while reacting to real/physical world events, to provide services for information transfer, analytics, applications and communications. Examples of entities include humans, organizations, subscribers, online social networks, wireless/wired sensors, smart phones, smart watches, application PCs, PCs, laptops, tablets, IP telephones, servers, application servers, cameras, scanners, printers, near-field communication devices like RFID tags and RFID readers, vehicles, biomedical equipment, and others. In some implementations, the singular "entity" and the plural "entities" are used interchangeably in this application for clarity. In this application, in some implementations, "entities" are "data sources", "users", and other actors.

Online Social Network: An "online social network" is defined as any combination of software, protocols and/or hardware configured to allow a community of users or individuals and/or other entities to share information, resources and the like via a computer network (such as the Internet). An online social network uses a platform like a website, blog or forum to foster interaction, engagement and information sharing. Some examples of an online social network include Facebook™, Twitter™, YouTube™, Flickr™, Picasa™, Digg™, RSS™, Blogs™, Reddit™, LinkedIn™, Wikipedia™, Pinterest™, Google Plus+™, MySpace™, Bitly™ and the like. This application, in some implementations, interchangeably refers to "online social network" as "social network", "social media site", "social networking service", "social media source" and "social networking entity", and vice-versa.

Application Programming Interface: An "application programming interface (API)" is defined as a packaged collection of code libraries, methods and fields that belong to a set of classes, including its interface types. The API defines the way that developers and programmers can use the classes for their own software development, by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. For example, Twitter's Search API involves polling Twitter's data through a search or username. Twitter's Search API gives developers and programmers access to data set that already exists from tweets which have occurred. Through the Search API, developers and programmers request tweets that match search criteria. The criteria can be keywords, usernames, locations, named places, etc. In another example, Twitter's Streaming API is a push of data as tweets are posted in near real-time. With Twitter's Streaming API, developers and programmers register a set of criteria (e.g., keywords, usernames, locations, named places, etc.) and as tweets match the criteria, they are pushed directly to the developers and programmers. In yet another example, Twitter Firehose pushes data to developers and programmers in near real-time and guarantees delivery of all the tweets that match the set criteria.

Application: An application refers to a network hosted service accessed via a uniform resource locator (URL). Examples include software as a service (SaaS) offerings, platform as a service (PaaS) offerings, and infrastructure as a service (IaaS) offerings, as well as internal enterprise applications. Examples of applications include Salesforce1 Platform™, Sales Cloud™, Data.com™, Service Cloud™, Desk.com™, Marketing Cloud™, Pardot™, Wave Analytics™, Box.net™, Dropbox™, Google Apps™, Amazon AWS™, Microsoft Office 365™, Workday™, Oracle on Demand™, Taleo™, Yammer™ and Concur™. In one implementation, an application offers insights to end-users in the form of rich visualization, using GUI and/or API based tools like standard graphs, bars, charts and overlaid infographics.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Introduction

We describe a system and various implementations of providing sub-second responses to complex analytical queries over high-volume near real-time (NRT) data streams. The technology disclosed includes receiving an analytical query that requires up-to-date computation over high volume of historical data, identifying a first query component of the analytical query that applies to historical data, identifying a second query component of the analytical query that applies to up-to-date data, accessing a contextual store that includes pre-computed data processed by a batch processing framework and assembling the historical data from the contextual store, generating the up-to-date data using a stream processing framework and responding to the analytical query by automatically generating for display data that combines the historical data and the up-to-date data.

Our world today is composed of the 1s and 0s that make up the binary code created by the streams of data flowing through every sector of the global economy. How much data is that?

According to IBM, 1 2.5 exabytes of data were created every day in 2012. That is 2.5 billion gigabytes of data in a single day. Facebook alone was responsible for 500,000 gigabytes a day in the same year. The importance of data is becoming so big, even the U.S. Government has launched an initiative, Data.gov, to help access and analyze it. The good news is that data processing and storage costs have decreased by a factor of more than 1,000 over the past decade. But once that data is stored, it is difficult to retrieve and use.

According to The Boston Consulting Group, 4 one third of all bank data is never used. A big part of this is the fact that 75% of the data we generate is unstructured. It is randomly organized, difficult to index, and therefore difficult to retrieve.

Where is all of this data coming from? An obvious source is the data that is being generated from legacy systems of record. It is data from cloud software as witnessed by the rapid adoption of Software as a Service (SaaS) as the new business application model.

It is data being created every second from mobile phones, devices, and sensors that are being placed on just about everything that can be monitored in the physical world. And social media represents the largest data streams, which are being created in astronomical volumes.

Forget about texts, and think of all the photos and videos being uploaded via smartphones to popular services like YouTube, Facebook, Instagram, and Twitter.

The smartphone is currently the major enabler of this data tsunami. PCs and feature phones (mobile phones that are not smartphones) are both in decline while smartphones are growing in the opposite direction, even in regions such as sub-Saharan Africa. And where there is a smartphone, there is an application for practically every human endeavor.

Applications are the smartphone control point for all of the real-time data streams being created by our fingers, the camera, the motion sensor, GPS antenna, Bluetooth antenna, and gyroscope. Smartphone manufacturers continue to jam more sensors and capabilities into these devices while developers continue to build applications that delight us all.

According to The Economist, 50% of the adult population in 2015 owns a smartphone. That will grow to 80% in 2020. But as impressive as smartphones are, the biggest ripple is just forming. To use a term coined by Andreessen Horowitz, it is the "sensorification" of the physical world. The combination of cheap, connected, miniaturized computers and sensors will create a world of smart, connected products and industrial equipment.

This new technology category is often called the "Internet of Things" (IoT). General Electric goes one step further, with the term "industrial internet", to include things like jet engines, locomotives, and Mill machines.

The Internet of Things represents a major and transformational wave of IT innovation. The Harvard Business Review calls this the third wave of IT-driven competition, with the first two waves brought by mainframes and mini-computers, and the rise of the Internet. Needless to say, harnessing and analyzing these data streams will represent the biggest challenge IT and businesses will face over the next decade.

The apt term used to describe this massive volume of data is "Big Data. For Big Data, traditional data storage technology is inadequate to deal with these large, high-speed volumes. And the challenges don not end there.

Enterprises will also need to figure out how to not only capture this data, but how to search, analyze, and visualize it as well as connect it with their business and customer data. The ultimate goal is the ability to perform predictive analytics and real-time intelligent decision-making. This is going to require an IT transformation from systems of record to systems of intelligence.

Before the advent of big data, the concept of business intelligence (BI) had already become a commonly used phrase back in the 1990s. A number of newly formed BI software vendors also entered the market at that time.

BI provided the methods and tools required for the transformation of data into meaningful and useful information for the business. The functions of BI during this period were fairly basic, namely, to collect and organize the data and visualize it in a presentable way.

Innovations continued and the introduction of data warehouses drastically reduced the time it took to access enterprise data from systems of record. Despite these innovations, a core challenge remains. Setting up these data warehouses requires deep expertise and using BI tools requires significant training.

The mere mortals in the line of business still cannot use these tools in an accessible way. Most BI tools are pretty good at getting answers when you know ahead of time the questions you are asking. Sometimes you simply do not know what questions to ask. In short, these tools do not enable business users to obtain the insights when, how, and where they need them.

Fortunately, this is all changing. For the first time, data analytics tools are being built that are entirely designed and run in the cloud. There is no need for IT to provision hardware or install and configure the data platform. Performing all the associated integration and schema development has gone from months to days. This newfound agility has allowed innovation in technology to eliminate the traditional two-step service bureau model where every request from the line of business required It is involvement.

These innovations are paving the way for a democratization of data so that business users can not only get access to data but also participate in its analysis. This means a self-service model with direct access to answers without the need for analysts, data scientists, or IT. Business users can find and share answers almost instantly. There is no hard requirement of needing to know ahead of time what questions to ask of the data. Business users can quickly bang out questions that allow them to explore and gain insights into the data sets.

Furthermore, this democratization is powered by mobile. Using their smartphone, tablets, or wearables, workers can now gain access to data and answers to pressing business questions whenever and wherever they are. The democratization of data has become a necessary phase in the journey toward building systems of intelligence.

While the fruits of data democratization are plenty, the process itself mostly deals with empowering business users with access to and analysis of data from legacy systems of record and cloud-based business applications. At best, some of these new BI tools can provide near real-time access and analysis of data. But they are not engineered for capturing and analyzing actual real-time streams of data emanating from smartphones, wearables, and the coming explosion of sensors in the physical world.

Real-time data streams deliver information that is quite different from the backward-looking, historical data most BI tools and platforms harness. Real-time data is perishable. That means it not only needs to be detected, it needs to be acted upon. The concept of "time to insight" emerges as one of the key performance indicators for systems of intelligence. These insights are going to require a whole new level of packaging and consumption. The information needs to be delivered in context, at the right time, and in a way that cuts through the cacophony of data we are exposed to in our daily work lives.

Systems of intelligence require knowing what to do with the data insights and how they should be delivered to the appropriate worker based on their job function and role inside the organization. These systems are every bit as democratic as modern BI tools in that they are easy to configure and get up and running. They are also designed to deal with the daily deluge of data we are confronted with every day at work. Consumer applications such as social media, traffic, and news aggregating applications help us more intelligently deal with the things that matter to us most.

The bar for applications connected to our systems of intelligence is as high as for consumer applications. This means one click installation, a lovely and simple user interface, and accessibility via mobile device of your choosing. The harnessing and analysis of real-time data streams begins to open up not only action in real time, but the ability to anticipate what is going to happen. This has traditionally been the realm of data scientists who handle everything from statistics and computational modeling to visualization and reporting. Models created by data scientists mostly look at past historical trends and use the data to predict patterns and future trends. Trying to build computational models that look at large volumes of real-time data streams presents a significant human resource challenge for enterprises.

According to McKinsey Global Institute, by 2018, the United States alone could face a shortage of 140,000 to 190,000 people with deep analytical skills as well as a shortage of 1.5 million managers and analysts with the know-how to use the analysis of big data to make effective decisions.

Few companies have the data scientists to both analyze real-time big data streams and do something with it. Many organizations simply cannot fill existing open jobs with qualified individuals. Nor will universities prepare enough data scientists to meet the demand in the coming years. But let's say you get your data scientists in place to analyze and structure the data. What next? How do you translate this into something actionable? How do you train your line managers and directors to make sense of the analysis in order to make the right decisions?

While systems of intelligence will not be replacing data scientists anytime soon, these systems will go a long way toward alleviating the need to hire a huge staff of data scientists. Systems of intelligence harness and scale the collective wisdom, expertise, and gained insights of the organization such that intelligent decision-making becomes the sum of all these. The collective intelligence can be expressed like rules in a rules engine. These are powerful tools that allow business users to take this collective intelligence and compose simple, logical business rules that evaluate and analyze real-time data streams to produce intelligent decisions.

Data science includes the process of formulating a quantitative question that can be answered with data, collecting and cleaning the data, analyzing the data, and communicating the answer to the question to a relevant audience.

Most of the initial fruits harvested by enterprises from their systems of intelligence will be of the low-hanging variety, namely, value obtained from the expression of simple business rules described above. But as organizations gain greater insights from their systems of intelligence and more devices and sensors become part of the equation, the role of algorithms and machine learning will play a larger part in intelligent decision-making.

Enterprises will increasingly turn to artificial intelligence as they will never be able to hire enough business analysts and data scientists to sift through all the data. Credit card fraud detection is a great example and it is becoming quite sophisticated.

Artificial intelligence does not totally eliminate the need for a trained fraud expert, but it drastically reduces the number of suspicious cases that require human investigation.

There will be many considerations to explore as organizations spin up their big data efforts. It is going to require the right people, the right tools, and the right methods. The technology that is coming together today is essentially unbounded in the sources and magnitudes of the data sets. It is ready to handle ad hoc questions to whatever depth you care to go.

The next step beyond this are the systems of intelligence that start to tell customers what questions they need to be asking. Getting there will require a blueprint for systems of intelligence.

The source of data streams are the signals emanating in real-time from mobile devices such as smartphones and consumer wearables like the Fitbit and Apple Watch. The control point for these signals is the application.

The application is what puts context behind the raw data that gets created by human inputs and the sensors embedded in these devices.

According to Wikipedia, a sensor is a transducer whose purpose is to sense or detect some characteristic of its environs. It detects events or changes in quantities and provides a corresponding output, generally as an electrical or optical signal.

Tying all of this together is the digital plumbing, or application programming interfaces (APIs). Along every critical element of the data stream flow represented in this schematic, APIs will enable this end to end transport of high speed and high volume data in the system. Although the term, API, may not be in the common vernacular outside of IT, it will be, much in the same way that terms of art to describe the web and internet are common language in business communication today.

The major gushers of data streams will be the connected consumer products and industrial equipment and machines. These real-time signals will emanate from product sensors inside our automobiles, inside our homes, on our valuables, our security systems, and anywhere in our physical environment that matters.

Signals from the industrial internet will emanate from sensors on any piece of equipment or machine that requires monitoring, maintenance and repair. Anything than can be digitally monitored with sensors in the physical environment will be. Systems of intelligence must be able to identify these signals and harness them.

In order to capture the high-volume and high-speed data signals, a "digital watchdog" is needed to monitor these signal inputs. If anything significant happens with these digital signals, an event is registered. A very simple example of an event is when a temperature sensor goes off in your automobile to warn you of freezing conditions outside.

Systems of intelligence will require the technology to ingest and monitor these data streams. The events created by the digital signals get broadcasted via messages and moved through the system so that the digestion process can proceed as planned. This is where filters can begin their job of further analyzing these data streams. For the system to function properly, it must be able to handle growing volumes and increased speeds of data flow and must not be lost if there is a breakdown or crash in that system.

Once data is captured and processed, it moves along into the digestion phase. This is where some of the magic starts to happen. This includes the monitoring and analytical processing of real-time data streams. Once the data is analyzed and processed, it needs to be put somewhere.

The data streams flowing in are not suitable for traditional database storage such as relational databases using structured query language. This requires specialized technology that can handle and store very large data sets, an essential element of systems of intelligence.

Another key component of this system is the ability to apply filters in the form of business rules that get applied to the analysis of the data streams. This will begin the process of eliminating human errors by expressing the collective wisdom and expert knowledge of the organization directly into the system. Artificial intelligence in the form of machine learning and algorithms can also be applied to these data streams for further analysis.

Enterprise data is comprised of the systems of record and systems of engagement that represent the mainstream of enterprise IT today. As IT migrated from mainframes and minicomputers to PCs and the Internet, systems of record have largely been about moving what were paper and manual processes into the digital era. Systems of record have been about automating everyday activities, capturing their information by products, and reporting what are essentially historical documents Systems of engagement are fundamentally different from systems of record in that they focus on the social nature of conversations and interactions with customers, partners and employees. Social media and the consumerization of IT shape how these conversations occur and across what channels. Instead of digital artifacts that are document based, systems of engagement add the elements of time, context, and place. Systems of record do not go away; it is just that enterprises need to embrace next-generation communication and collaboration with systems of engagement.

Systems of engagement and systems of record will be essential elements in providing context to the data streams, filtering, and analysis. You cannot make sense of the data streams and outputs if you do not have the full picture of the customer, the partner, the employee. These systems will be essential to illuminating the analytical insights and intelligent decisions driven by systems of intelligence.

After ingesting, digesting, and applying enterprise context to the data streams, the intelligent outputs are produced and delivered in the right form, at the right time, and to the right channel. The first two channels are dashboards and insights. Dashboards drive visualization and context of what is and what has happened so that humans can explore and take actions like launching new company initiatives, tweaking existing marketing programs or refining the rules based on intelligent decision-making. Insights rely more on delivering real-time decision-making. It is a key difference between dashboards and analytical insights. Expressing the collective knowledge and expertise of the organization through business rules goes a long way toward eliminating bad decisions that are easily avoidable. As signals increase and data streams flow into systems of intelligence, data scientists will be able to better apply their methods and models to create machine learning algorithms that deliver intelligent decisions in a predictive manner.

Moving along to the final phase of our data streams journey, the enterprise can now begin to apply the fruits of the intelligent outputs to commence the transformation of the business. Our central premise is that behind every application, device, connected product, and sensor is a customer. The role of IoT platform disclosed herein is to connect device data to the user success platform for engaging customers through sales, customer service, marketing, communities, applications and analytics.

The technology disclosed improves existing streaming processing systems by allowing the ability to both scale up and scale down resources within an infrastructure of a stream processing system. In addition, the technology disclosed leverages common dependencies between task sequences running in a container to reduce the strain on shared resources by eliminating dedicated per-pipeline hardware. Furthermore, the technology disclosed introduces natural elasticity to stream processing systems by minimizing the impact of small workloads on the systems.

Apache Storm™, Apache Trident™, Apache Spark™, Apache Samza™, Apache Flink™, etc. and most existing stream processing systems have classically focused exclusively on scaling up and scaling out of computational resources in a quest for more performance. These systems do not typically perform well in a constrained resource environment such as a small two-to-three machine cluster. Spark for example simply starts crashing once its in-memory grid is exhausted and also requires a minimum of one dedicated core per consumed Kafka partition. Running a few hundred simultaneous consumers in these systems requires potentially hundreds of dedicated cores. Storm with a two-to-three machine cluster runs at most perhaps twelve tasks sequences before requiring addition of more machines. This really makes these platforms appropriate only for large scale data processing that can justify the dedicated hardware required (which is what they are designed for).

For smaller, trivial workloads or data patterns that have wild variance in their load over time, these platforms are extremely expensive due to the minimum cost of hardware associated with a single "job". What this means to a user is that they would typically have to decide if a job is "big enough" to justify porting it to something like Storm or Spark.

The technology disclosed particularly singles out long tail task sequences that may initially have heavy activity but may need to remain active for months waiting for perhaps dozens of messages a day. In this case, a big-data platform is needed for the initial activity and that after the initial early load, the dedicated hardware will be wasted because it mostly is doing nothing. In Storm, no matter how trivial the workload, if there are thousand topologies, at least 1000 workers are needed to run them, which equates to roughly two-fifty machine instances if four workers are being run per machine. The technology disclosed allows for running one topology on thousand machines or thousand topologies on one machine.

The primary benefits of the technical solution include allowing users to run an arbitrary amount of work on a fixed hardware budget and allowing users to utilize the same environment, infrastructure and tools for both small and large jobs.

The technology disclosed also leverages common dependencies across task sequences. A job can always run in a dedicated container, which gives it full use of all available resources and excellent isolation from other processes. When jobs are multiplexed within the same container, they lose this isolation but gain locality that carries other benefits. For example, a typical application server shares a connection pool across all the applications hosted therein.

The technology disclosed can greatly reduce the strain on shared resources such as the database and message buses like Kafka™, persistence stores like Cassandra™ and global service registry like ZooKeeper™. In the technology disclosed, connections to Kafka™, Cassandra™ and ZooKeeper™ are all shared across hosted pipelines, thereby greatly reducing the potential load on these services. In some cases, the technology disclosed can eliminate dedicated per-pipeline hardware by leveraging shared local caches of resources. For instance, when there are dozens of pipelines, reading from the same Kafka topic can be done instead of making a call to Kafka for every pipeline.

Large systems hosting multiple workloads tend to be more naturally elastic than dedicated systems. For example, threads doing small amounts of work introduce only small delays in busier threads because they only borrow shared resources for exactly the amount of time they are needed. Dedicated systems instead depend on monitoring and dynamic allocation of resources, ideally adding and removing servers as workloads change. This is complicated to implement and almost impossible to accurately budget for. The technology disclosed adapts a stream processing system to minimize the impact of small workloads, thereby making the system more naturally elastic that degrades gracefully as workloads change. An example would be two tasks sequences, one for the U.S. and one for Europe that get the bulk of their load at opposite time of day. The technology disclosed applies most of the allocated resources (e.g. ninety percent) to the tasks sequence with actual load without a complex system of adding boxes at from 12 am to 4 am on one and 3 pm to 6 pm on the other.

The technology disclosed relates to simplifying for a non-programming user creation of an entity management workflow by using computer-implemented systems. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

In addition, the technology disclosed can be implemented using different programming models like MapReduce™, bulk synchronous programming, MPI primitives, etc. or different stream management systems like Apache Storm™, Apache Spark™, Apace Kafka™, Truviso™, IBM InfoSphere™, Borealis™ and Yahoo! S4™.

IoT Platform and Stream-Batch Processing Framework

Figure 2:
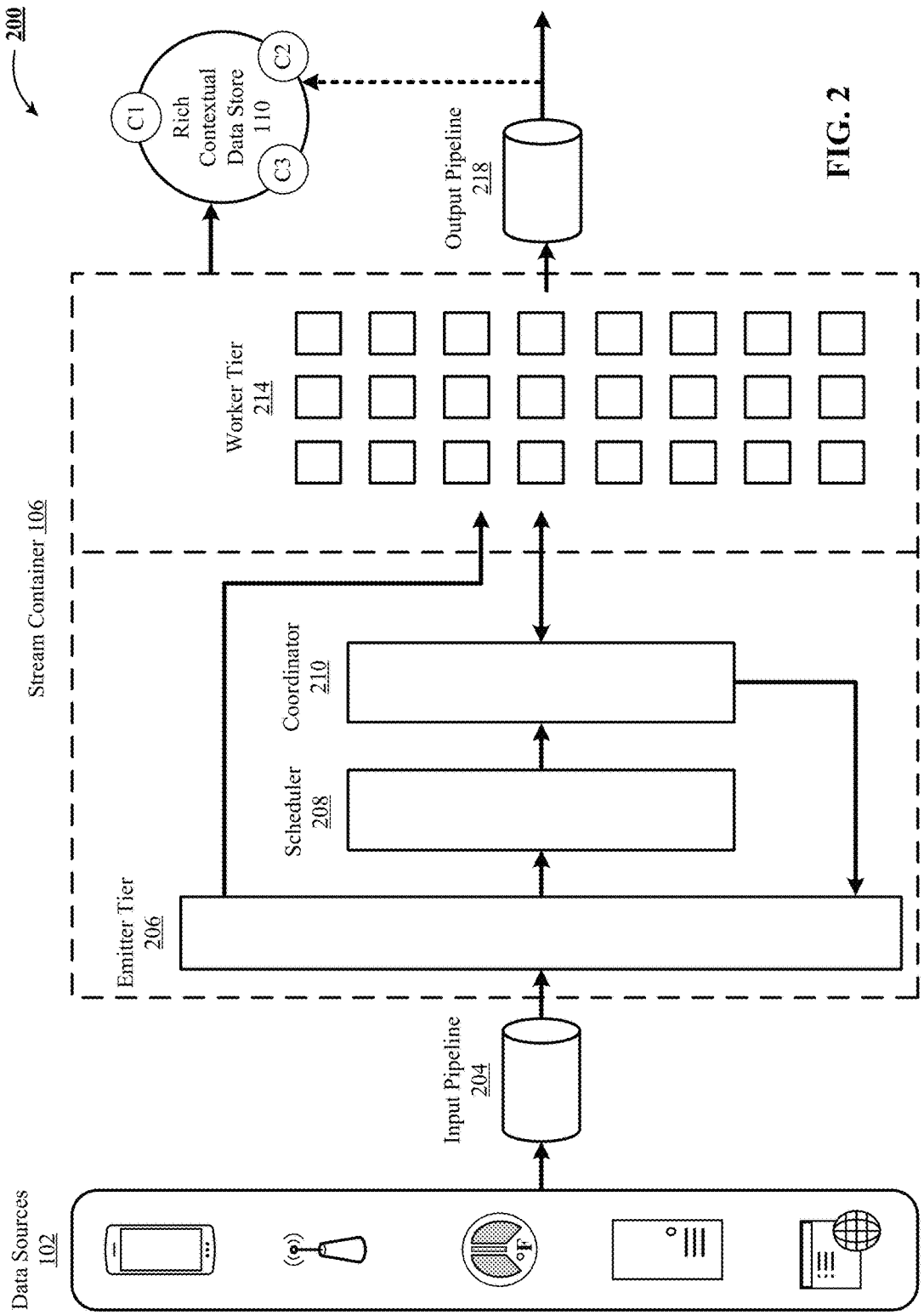
FIG. 2 illustrates a stream processing framework used by an IoT platform similar to the example IoT platform shown in FIG. 1A according to one implementation of the technology disclosed.

We describe a system and various implementations of simplifying for a non-programming user creation of an entity management workflow. The system and processes will be described with reference to FIG. 1A and FIG. 2 showing an architectural level schematic of a system in accordance with an implementation. Because FIG. 1A and FIG. 2 are architectural diagrams, certain details are intentionally omitted to improve the clarity of the description. The discussion of FIG. 1A and FIG. 2 will be organized as follows. First, the elements of respective figures will be described, followed by their interconnections. Then, the use of the elements in the system will be described in greater detail.

FIG. 1A includes exemplary IoT platform 100A. IoT platform 100A includes data sources 102, input connectors 104, stream container(s) 106, batch container(s) 108, rich contextual data store 110, orchestration system 112, output connectors 122 and application(s) 123. The rich contextual data store 110 includes various storage nodes C1-C3. Orchestration 112 includes a data entry columnar 114, an explorer engine 115, a live dashboard builder engine 116, a morphing engine 117, a tweening engine 118, a tweening stepper 119, an integrated development environment (IDE) 121 and a rendering engine 120. Application(s) 123 include various SaaS, PaaS and IaaS offerings. In other implementations, platform 100A may not have the same elements as those listed above and/or may have other/different elements instead of, or in addition to, those listed above.

Figure 1B:
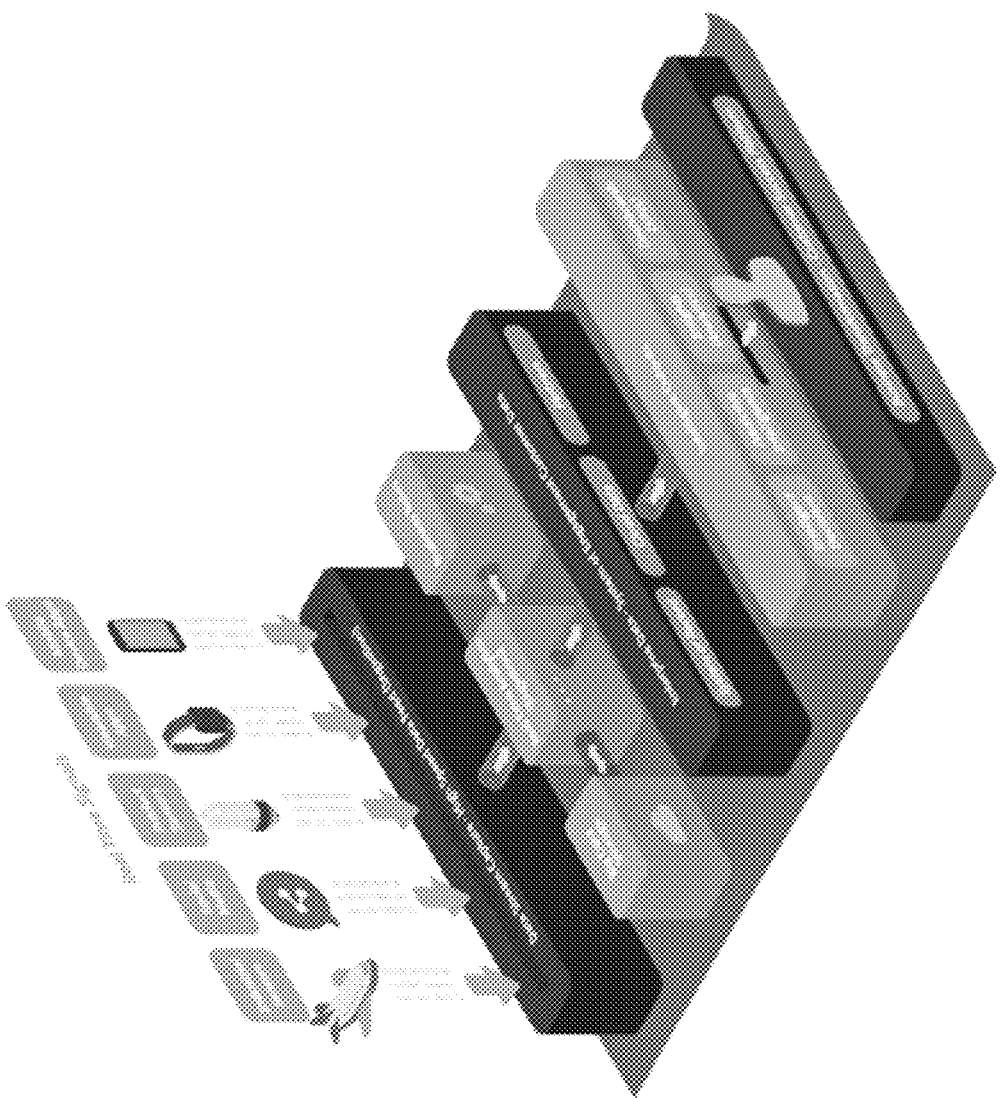
FIG. 1B is one implementation of an IoT environment.

FIG. 1B is one implementation of an IoT environment 100B. Environment 100B shows different elements of NRT data streams, from its initial creation as digital signals, to its capture, storage and processing, and its transformation into intelligent outputs.

FIG. 2 illustrates a stream processing framework 200 used in FIG. 1A's platform according to one implementation of the technology disclosed. In the implementation depicted in FIG. 2, framework 200 includes data sources 102, input pipeline 204, stream container 106, rich contextual data store 110 and output pipeline 218. Stream container 106 includes an emitter tier 206, a scheduler 208, a coordinator 210 and a worker tier 214. In other implementations, framework 200 may not have the same elements as those listed above and/or may have other/different elements instead of, or in addition to, those listed above.

The interconnection of the elements of IoT platform 100A and streaming framework 200 will now be described. A network (not shown) couples the data sources 102, the input connectors 104, the stream container 106, the batch container 108, the rich contextual data store 110, the orchestration system 112, the columnar 114, the output connectors 122, the application(s) 123, the input pipeline 204, the emitter tier 206, the scheduler 208, the coordinator 210, the worker tier 214 and the output pipeline 218, all in communication with each other (indicated by solid arrowed lines). The actual communication path can be point-to-point over public and/or private networks. Some items, such as data from data sources 102, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, SecureID, digital certificates and more, can be used to secure the communications.

Having described the elements of FIG. 1A (IoT platform 100A) and FIG. 2 (streaming framework 200) and their interconnections, the system will now be described in greater detail.

Data sources 102 are entities such as a smart phone, a WiFi access point, a sensor or sensor network, a mobile application, a web client, a log from a server, a social media site, etc. In one implementation, data from data sources 102 are accessed via an API Application Programming Interface) that allows sensors, devices, gateways, proxies and other kinds of clients to register data sources 102 in the IoT platform 100A so that data can be ingested from them. Data from the data sources 102 can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth. Events can be in a semi-structured data format like a JSON (JavaScript Option Notation), BSON (Binary JSON), XML, Protobuf, Avro or Thrift object, which presents string fields (or columns) and corresponding values of potentially different types like numbers, strings, arrays, objects, etc. JSON objects can be nested and the fields can be multi-valued, e.g., arrays, nested arrays, etc., in other implementations.

As described infra, near real-time (NRT) data streams 103 are collections of events that are registered as they are generated by an entity. In one implementation, events are delivered over HTTP to input pipeline 204. In another implementation, events are transmitted via POST requests to a receiver operating on behalf of input pipeline 204. For instance, Twitter Firehose API and Twitter4j (accessible via Twitter-affiliated companies like Datashift and nTweet-Streamer) provide unbounded time stamped events, called tweets, as a stream of JSON objects along with metadata about those tweets, including timestamp data about the tweets, user information, location, topics, keywords, retweets, followers, following, timeline, user line, etc. These JSON objects are stored in a schema-less or NoSQL key-value data-store like Apache Cassandra™, Google's Big-Table™, HBase™, Voldemort™, CouchDB™, MongoDB™, Redis™, Riak™, Neo4j™, etc., which stores the parsed JSON objects using key spaces that are equivalent to a database in SQL. Each key space is divided into column families that are similar to tables and comprised of rows and sets of columns.

The input connectors 104 acquire data from data sources 102 and transform the data into an input format that is consumable by containers 106 and 108. In one implementation, the input connectors 104 perform full data pulls and/or incremental data pulls from the data sources 102. In another implementation, the input connectors 104 also access metadata from the data sources 102. For instance, the input connectors 104 issue a "describe" API call to fetch the metadata for an entity and then issue the appropriate API call to fetch the data for the entity. In some implementations, customized input connectors 104 are written using the Connector SDK™ for individual data sources 102.

In other implementations, a workflow definition includes a collection of connectors and operators as well as the order to execute them. In one implementation, such a workflow is specified as a directed graph, where connectors and operators are graph nodes and edges reflect the data flow. In yet other implementations, multiple data streams 103 are joined and transformed before being fed to the containers 106 and 108.

Batch processing framework operating in container(s) 108 generates business intelligence using OnLine Analytical Processing (OLAP) queries, which are stored in rich contextual data store 110. In one implementation, events are stored in batch container(s) 108 to act as a backup for raw events on which batch processing jobs can run at any given time. Batch container(s) 108, in some implementations, provides raw counts as well as descriptive statistics such as mean, median and percentile breakdowns. In one implementation, analytics tool like Scalding™ and Pig™ are included in batch container(s) 108 to provide retrospective analysis, machine learning modeling, and other batch analytics. In yet other implementations, batch container(s) 108 is used to correct errors made by the stream container 106 or to handle upgraded capabilities by running analytics on historical data and recompute results. Examples of a batch processing framework include Hadoop distributed file system (HDFS) implementing a MapReduce programming model.

Batch container(s) 108 ingest event tuples from respective input pipelines that collect data for a plurality of NRT data streams. In some implementations, multiple NRT data streams can be assigned to a single pipeline and multiple pipelines can be assigned to a single batch container.

Stream processing framework 200 provides near real-time (NRT) processing of sequences of unbounded events for delivery of immediate analytics and insights based on the events as they are occurring. In one implementation, framework 200 processes one million events per second per node. Framework 200 can be implemented using one or more stream processors like Apache Storm™ and Apache Samza™ or a batch-stream processor such as Apache Spark™. In one implementation, framework 200 includes an API to write jobs that run over a sequence of event-tuples and perform operations over those event-tuples.

Events are ingested into framework 200 by input pipeline 204, which reads data from the data sources 102 and holds events for consumption by the stream container 106. In one implementation, input pipeline 204 is a single delivery endpoint for events entering the container 106. Examples of input pipeline 204 include Apache Kafka™, Kestrel™, Flume™ ActiveMQ™, RabbitMQ™, HTTP/HTTPS servers, UDP sockets, and others. In some implementations, input pipeline 204 includes a listener capable of listening NRT data streams 103 and data flows originating from the data sources 102 by connecting with their respective APIs (e.g., Chatter API, Facebook API (e.g., Open Graph), Twitter API (e.g., Twitter Firehose, Sprinklr, Twitter Search API, Twitter Streaming API), Yahoo API (e.g., Boss search) etc. via the Internet. In some implementations, a listener includes heterogeneous instances responsible for the intake of data from different data sources 102. According to an implementation, the input pipeline 204 can be configured to receive the data over the network(s) using an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or User Datagram Protocol (UDP).

In a particular implementation, Apache Kafka™ is used as the input pipeline 204. Kafka is a distributed messaging system with a publish and subscribe model. Kafka maintains events in categories called topics. Events are published by so-called producers and are pulled and processed by so-called consumers. As a distributed system, Kafka runs in a cluster, and each node is called a broker, which stores events in a replicated commit log. In other implementations, different messaging and queuing systems can be used.

In one implementation, NRT data streams 103 are queued in input pipeline 204 as batches. In one implementation, a batch is defined as an assemblage of event tuples, also referred to as "units of work", defined on a time-slice basis and/or a batch-size basis. A time-slice based definition includes partitioning at least one incoming NRT data stream by its most recently received portion within a time window (e.g., one batch keeps the event tuples from last one second). A batch-size based definition includes partitioning at least one incoming NRT data stream by a most recently received portion limited or restricted to or constrained by a data size (e.g., one batch includes 10 MB of most recently received event tuples). In other implementations, a combination of time-size basis and batch-size basis is used to define batches.

In a particular implementation, Apache Storm™ operates in stream container 106 and performs real-time computation using a matrix of user-submitted acyclic graph, comprised of a network of nodes called "Spouts" or "emitter nodes" (collectively referred to as the emitter tier 206 in FIG. 2) and "Bolts" or "transformers" collectively referred to as the worker tier 214 in FIG. 2). In a Storm matrix, a Spout is the source of NRT data streams 103 and a Bolt holds the business logic for analyzing and processing those streams to produce new data as output and passing the output to the next stage in the matrix. In one implementation, a special Kafka Spout emits events read from a Kafka topic as batches to the bolts in worker tier 214.

Worker tier 214 includes bolts or worker nodes (shown as cubes in FIG. 2) that perform various stream processing jobs such as simple data transformation like id to name lookups, up to complex operations such as multi-stream joins. Specifically, worker nodes in the worker tier 214 can perform tasks like aggregations, functions and stream groupings (e.g., shuffle grouping, fields grouping, all grouping, global grouping, filtering and commits to external persistence layers like rich contextual data store 110. In some implementations, worker nodes in a worker tier 214 have transitive dependencies between related processing stages where upstream stages produce event tuples that are consumed by downstream stages.

The messages passed within stream container 106 are called tuples. A tuple is a set of values for a pre-defined set of fields. Each spout and bolt defines the fields of the tuples it emits statically in advance. All tuples are serialized into a binary form before transmission to other components in the stream container 106. In some implementations, this serialization is handled by the Kryo library, which provides a fast serialization of Java objects.

Stream container 106 allows for parallelization of spouts and bolts using different tuple grouping strategies to pass event streams. The grouping strategy defines the partitioning of an event stream and controls the degree of parallelism of the next computational unit, where degree of parallelism refers to the number of logically parallel threads.

Scheduler 208 tracks one or more input pipelines (e.g., input pipeline 204) in the stream container 106 and schedules execution of batches and any downstream processing stages that depend on the output of an upstream completed processing stage. In one implementation, scheduler 208 assigns a unique batch identifier (ID) to each batch in the input pipeline 204. Further, scheduler 208 triggers either a resend of the current batch or the next batch along with corresponding stage information on a per pipeline basis. Scheduler 208 also sends messages to the coordinator 210 in the form [pipeline:'a',batch:7,stage'b']. In some other implementations, scheduler 208 assigns priority-levels to different pipelines in the IoT platform 100A. These priority-levels control execution of a first number of batches from a first pipeline before execution of a second number of batches from a second pipeline.

Coordinator 210 controls dispatch of batches to worker nodes in the worker tier 214. When the scheduler 208 triggers a batch-stage, the coordinator 210 sends triggers to the emitter tier 206 and worker tier 214 who are responsible for that particular stage. When [pipeline:'a',batch:7, stage'b'] is received by the coordinator 210, it contacts two of the hundred available worker nodes. These are the two worker nodes that received input from stage 'a'.

Coordinator 210 also tracks pending units of work in the stream container 106 for a given batch-stage to enable efficient "long-tail" operations where it is likely that a substantial portion of the allocated resources for a process may not be needed for a particular batch. Take a single distributed operation consisting of stage [a] and stage [b] such that the output of stage [a] is used at stage [b], represented as stage [a]->stage [b]. Now, assume that according to one implementation stage [a] runs on hundred worker nodes (each running on a physical node) and stage [b] runs on hundred worker nodes (each running on a physical node) and stage [a] produces output only for two instances of stage [b]. When stage [a] has fully executed and stage [b] begins, the coordinator 210 knows that only two of the hundred worker nodes allocated to stage [b] need to be invoked. Similarly for three stage processing, represented as stage [a]->stage [b]->stage [c], where stage [b] receives no input from stage [a] and therefore stage [c] will also receive no input, coordinator 210 avoids all extraneous communication to stage [b] and stage [c]. In the case of all data in stage [a] being filtered out, there is no communication overhead with the worker nodes allocated to stage [b] and stage [c].

Stream container(s) 106 ingest event tuples from respective input pipelines that collect data for a plurality of NRT data streams. In some implementations, multiple NRT data streams can be assigned to a single pipeline and multiple pipelines can be assigned to a single stream container.

Rich contextual data store 110 stores large volumes of historical data and allows for historical query based analytics that are combined with near real-time analytics. In one implementation, rich contextual data store 110 is used to take a snapshot of tasks in the IoT platform 100A and store state information about the pipelines, spouts, bolts and other elements of the IoT platform 100A. In some implementations rich contextual data store 110 is a NoSQL key-value column store distributed storage system like Apache Cassandra™. Data sent to Cassandra™ is spread out across many nodes or commodity servers C1-C3, connections to which can be made using a Java, Scala, Ruby, Clojure or Python based APIs (e.g., Hector, Pelops, CQL, Thrift, Phpcassa, PyCassa, etc.). Cassandra stores data in units called columns. Each column is a tuple, a list of associated data elements. The basic column format can be represented as (name, value, timestamp). For brevity, the timestamp, while an essential element of the column, is often not written. Thus, an example column may be written (UserName, User-1). An optional level of hierarchy called a super column may incorporate any number of columns. Moving up a level, keys (sometimes referred to as rows) are tuples that include a name and one or more columns or super columns. An example key may be written (Status_Key, (UserName, User-1), (Logged_In, Y). Any number of keys may be grouped into a column family. Analogously, a group of column families is referred to as the keyspace, the final level of hierarchy. Two pseudo code representations of the relationship can be constructed as follows:

[keyspace] [column family] [key] [column]
[keyspace] [column family] [key] [super column] [column]

Output pipeline 218 collects and queues processed events for delivery to a persistent store. In one implementation, data from output pipeline 218 is transmitted concurrently to a SQL data store and NoSQL data store like rich contextual data store 110. Output pipeline 218 can also be hosted by Kafka, which acts a sink for the output of the jobs.

Orchestration

Orchestration 112 is a web platform that enables non-programmers to construct and run an entity management workflow. Orchestration 112 utilizes a declarative and visual programming model that generates a data entry columnar 114, which accepts declarative and drag-drop input. In one implementation, orchestration 112 allows non-programmers to design their own workflows visually without extensive programming knowledge. In one implementation, orchestration 112 uses a formal declarative description stored in a JSON configuration file. The JSON file defines behaviors used in a session, including states of an entity during a life cycle that specify events to handle, state transition triggers, the transition rules to be used, and responsive actions that specify the actions rules to be used, along with other parameters and variables to be used in a workflow. In other implementations, different programming languages like hypertext markup language (HTML), standard generalized markup language (SGML), declarative markup language (DML), extensible markup language (XAML), extensible stylesheet language (XSL), extensible stylesheet language transformations (XSLT), functional programming language like Haskell and ML, logic programming language like Prolog, dataflow programming language like Lucid, rule-based languages like Jess, Lips and CLIPS, and others can be used.

In another implementation, orchestration 112 includes a declarative component and a run-time component. Using the declarative component, a non-programmer declares entity states, transition triggers for the states, responsive actions for the states and other parameters and variables of the entity lifecycle workflow. In one implementation, the declarative component offers existing workflow or workflow excerpts common used by other users and communities. In one implementation, the declarative input is received at a browser in a visual manner rather than as a result of writing code. The declarative input is then translated by orchestration 112 into a package of declarative files (e.g., XML) that can be directly executed in the run-time component.

In a further implementation, the runtime component of orchestration 112 includes a translator that interprets the declarative files using relational and XML-native persistent services, gateway, SOAP, REST API and semantic functionalities like machine learning, clustering, classifier-based classification and recommendation, context text analysis, text extraction and modeling, deep linguistic analysis and expressions based alphanumeric pattern detection.

In yet another implementation, orchestration 112 serves as a rule engine and scripting environment for non-declarative languages like Java and C++. In such an implementation, orchestration 112 provides rule-based programming in a high-level procedural or imperative programming language by continuously applying a set of rules to a set of facts. The rules can modify the facts or execute and procedural or imperative code (e.g., Java code). In some implementations, orchestration 112 includes a graphical rule development environment based on an integrated development environment (IDE) providing editor functions, code formatting, error checking, run and debug commands and a graphical debugger.

Orchestration 112 also includes an explorer engine 115, a live dashboard builder engine 116, a morphing engine 117, a tweening engine 118, a tweening stepper 119, an integrated development environment (IDE) 121 and a rendering engine 120.

A disclosed live dashboard builder engine 116 designs dashboards, displaying multiple analytics developed using the explorer engine 115 as real-time data query results. That is, a non-technical user can arrange display charts for multiple sets of query results from the explorer engine 115 on a single dashboard. When a change to a rule-base affects any display chart on the dashboard, the remaining display charts on the dashboard get updated to reflect the change. Accurate live query results are produced and displayed across all display charts on the dashboard.

In one implementation, a real-time query language called "EQL language" is used by orchestration 112 to enable data flows as a means of aligning results. It enables ad hoc analysis of registered event tuples. A non-technical user can specify state definitions, state transition triggers, state transition conditions and state transition actions to change query parameters and can choose different display options, such as a bar chart, pie chart or scatter plot—triggering a real-time change to the display chart—based on a live data query using the updated rule-base. Statements in an EQL script are made up of keywords (such as filter, group, and order), identifiers, literals, or special characters. EQL is declarative; you describe what you want to get from your query. Then, a query engine will decide how to efficiently serve it.

In one implementation, a runtime framework with an event bus handles communication between application(s) 123 running on user computing devices, a query engine (not shown) and an integrated development environment 121, which provides a representation of animated data visualizations implemented in a hierarchy of levels including states, triggers, state transitions, responsive actions, entity activity levels and variations among them over time.

Rendering engine 120 transforms non-procedural data structures that represent the shapes and the animation of transitions between the shapes, into rendered graphics.

In other implementations, orchestration 112 may not have the same elements as those listed above and/or may have other/different elements instead of, or in addition to, those listed above.

The output connectors 122 send data from orchestration 112 and/or output pipeline 218 and transform the data into an output format that is consumable by application(s) 123. In one implementation, the output connectors 122 perform full data pushes and/or incremental data pushes from the orchestration 112. In another implementation, the output connectors 122 also provide metadata from orchestration 112. In some implementations, customized output connectors 122 are written using the Connector SDK™ for individual application(s) 123.

Application(s) 123 include components adapted for operating in the IoT platform 100A. The IoT platform 100A, or an analog, can be provided by a node such as an application server node. Application(s) 123 can include an incoming and outgoing data handler component for receiving and transmitting information from and to the plurality of application server nodes via the network(s).

In an implementation, the application(s) 123 include a data store for storing a plurality of data objects including a plurality of contact records, a plurality of account records, and/or other records (collectively application records). In some implementations, an application record can include, but is not limited to, a tuple corresponding to a user, a file, a folder, an opportunity, an account, an event, and/or any data object. Application(s) 123 can include a data manager component that can be configured to insert, delete, and/or update the records stored in the data store. In addition, application(s) 123 can include a monitoring agent that is configured to monitor activities related to the application records. For example, the monitoring agent can be configured to track a user's post via a public or private social networking service, and/or a user's e-mail client on the user's enterprise desktop computer, and to monitor updates to the contact records, event records, and/or any other application record(s) stored in the data store.

Processed events can additionally be used by application(s) 123, such as Salesforce.com offerings like Sales Cloud™, Data.com™, Service Cloud™, Desk.com™, Marketing Cloud™, Pardot™, Service Cloud™ and Wave Analytics™. For example, processed events can be used to identify opportunities, leads, contacts, and so forth, in the application(s) 123, or can be used to support marketing operations with products such as Radian6™, Buddy Media™ services, and the like. The processed events can also then in turn be used to find these specific users again on these social networks, using matching tools provided by the social network providers. Additionally they could also be layered with specific targeting learned from the aggregation and analysis by the stream container 106 and orchestration 112 respectively.

In an implementation, IoT platform 100A can be located in a cloud computing environment, and may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of IoT platform 100A can be engines of varying types including workstations, servers, computing clusters, blade servers, server farms, or any other data processing systems or computing devices. The elements or components can be communicably coupled to the databases via a different network connection. For example, stream container 106 can be coupled via the network(s) (e.g., the Internet), batch container 108 can be coupled via a direct network link, and orchestration 112 can be coupled by yet a different network connection.

In some implementations, databases used in IoT platform 100A can store information from one or more tenants into tables of a common database image to form a multi-tenant database system (MTS). A database image can include one or more database objects. In other implementations, the databases can be relational database management systems (RDBMS), object oriented database management systems (OODBMS), distributed file systems (DFS), no-schema database management systems, or any other data storing systems or computing devices.

While IoT platform 100A is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

State Processing Network

Figure 3:
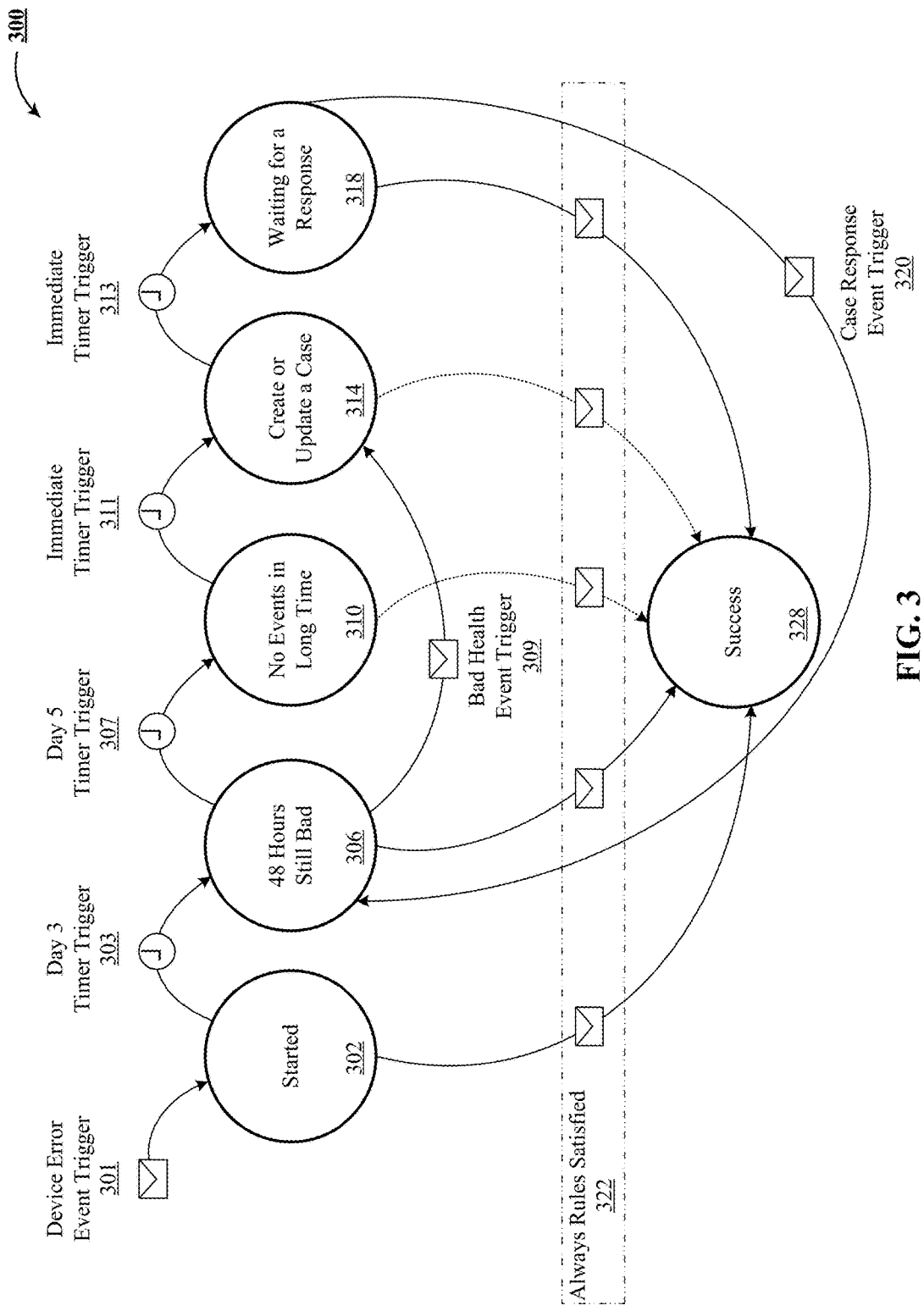
FIG. 3 is one implementation of a state processing network implementing an automated multi-step progression of interaction with an entity.

FIG. 3 is one implementation of a state processing network 300 implementing an automated multi-step progression of interaction with an entity. The diagram in FIG. 3 uses circles to represent states of an entity and arrows to represent transition triggers that cause transition from one state to another. Specifically, state processing network 300 represents life cycle management of an electronic device, such as a thermostat sensor. In one implementation, the electronic device is periodically pinged to receive state information about the device such as the device's battery levels and network connectivity levels. The states depicted in state processing network 300 include: a started state 302, 48 hours still bad 306, no events in long time state 310, create or update a case state 314, waiting for response state 318 and success state 328. Further, state processing network 300 includes two types of transition triggers: event triggers 301, 309, and 320 and time triggers 303, 307, 311 and 313. Additionally, when the always rules are satisfied 322, the system maintains the success state 328. An event trigger causes state transitions when a certain event is registered from the NRT data streams. A time trigger causes state transitions upon overrunning of a timer. In other implementations, different transition triggers can be defined such as custom triggers that override a default trigger and cumulative triggers that occur when combinations of events are registered.

Turning to the multi-step progression of interaction with the thermostat shown in FIG. 3, when a device error is detected in the NRT event stream, a device error event trigger 301 is registered that causes initiation of a ticket workflow designed to fix the detected error by creating a case in a service application such as Salesforce Service Cloud™. This initiation of the ticket workflow is represented by a started state 302. When the event stream confirms that the device error has not been fixed for three days since it was detected, a day 3 timer trigger 303 causes transition of the ticket workflow from the started state 302 to a 48 hours still bad state 306. From the 48 hours still bad state 306, a subsequent state transition is caused by either a day 5 timer trigger 307 or a bad health event trigger 309. The day 5 timer trigger 307 causes transition of the ticket workflow from the 48 hours still bad state 306 to a no events in long time state 310 when the event stream confirms that the device error has not been fixed for five days since it was detected. In another implementation, the bad health event trigger 309 causes transition of the ticket workflow from the 48 hours still bad state 306 to a create or update a case state 314 when the event stream confirms that the device's battery levels are low or the device's network connectivity is poor or both conditions exist.

When the ticket workflow reaches a no events in long time state 310, it immediately transitions to the create or update a case state 314 using an immediate timer trigger 311. Once at the create or update a case state 314, ticket workflow transitions to a waiting for a response state 318 by an immediate timer trigger 313 based on the fact that whether an application that applies the state processing network 300 has responded either by confirming that it has opened the case or whether it has failed in doing so.

Once at the waiting for a response state 318, if a case response event trigger 320 is registered that confirms that a case response was received, the ticket workflow transitions from the waiting for a response state 318 to the 48 hours still bad state 306.

In some implementations, the different states of the ticket workflow transition to a success state 328 upon registering always rules satisfied 322. In one exemplary implementation, the success state 328 represents receipt of events in the NRT event stream that confirm good health of the device i.e. the device's battery levels are high and the device's network connectivity is good. Whenever, the success state 328 is reached, the state processing network 300 is in steady state.

Data Entry Columnar

Figure 4A:
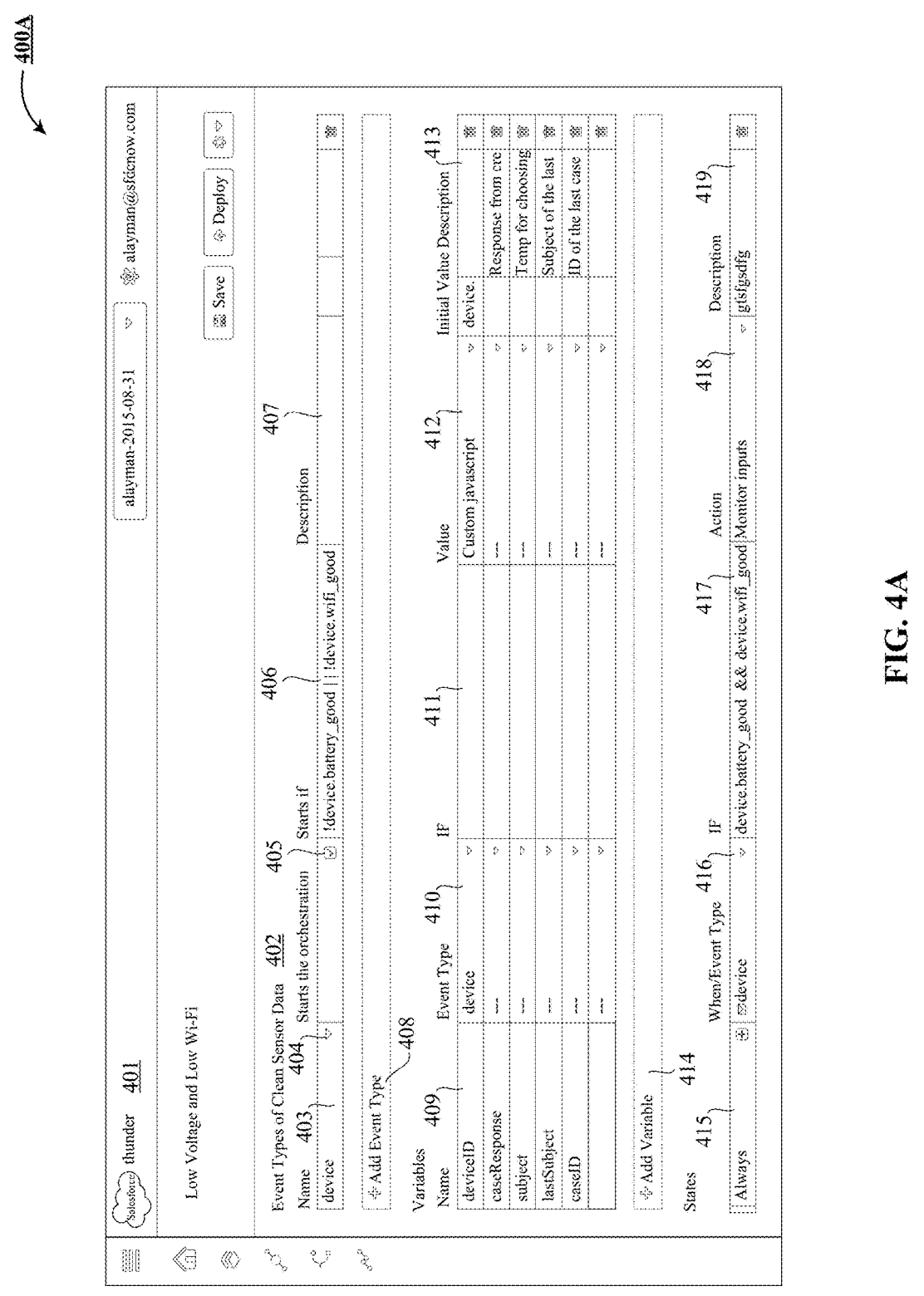
Figure 4B:
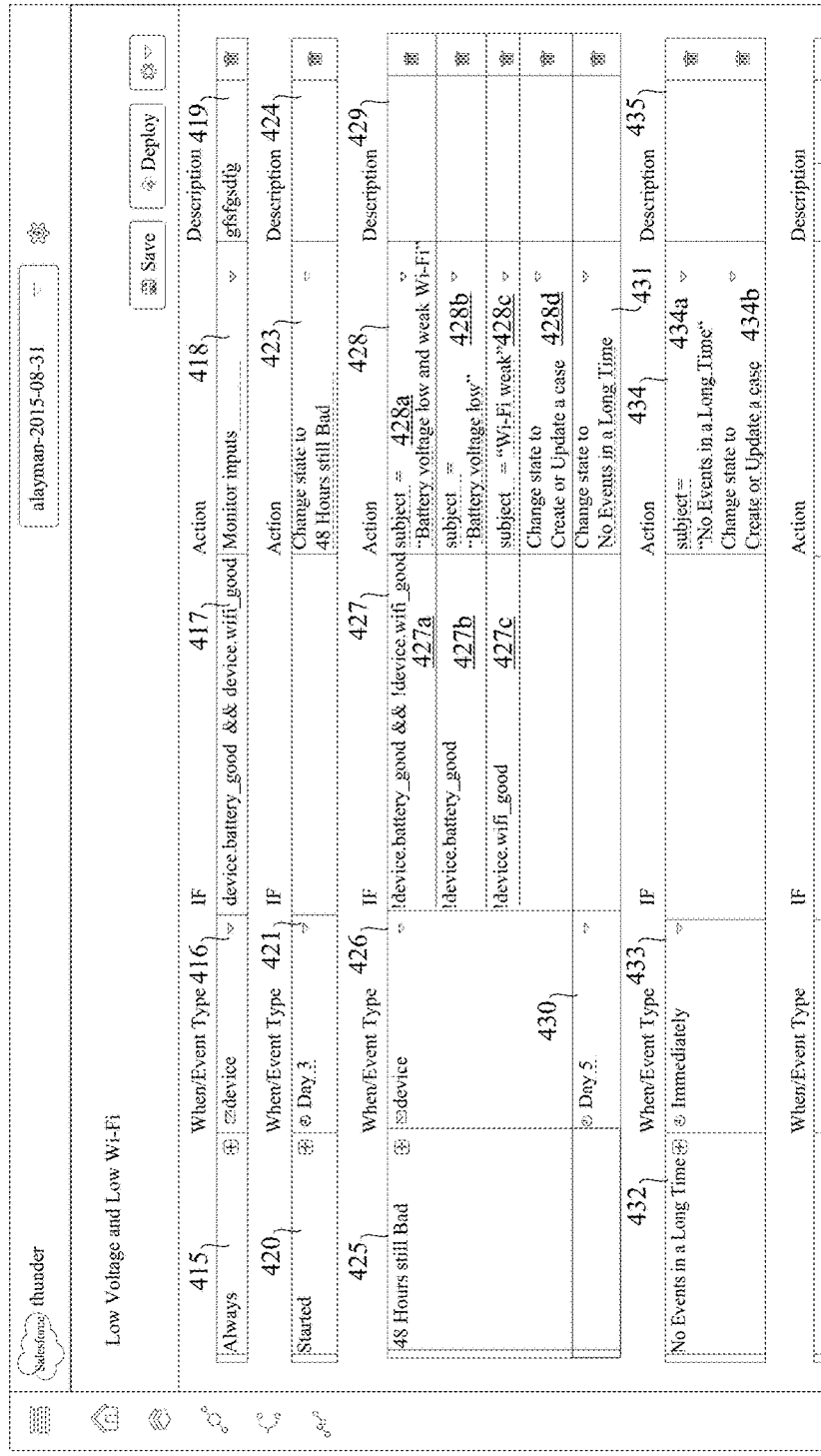
Figure 4C:
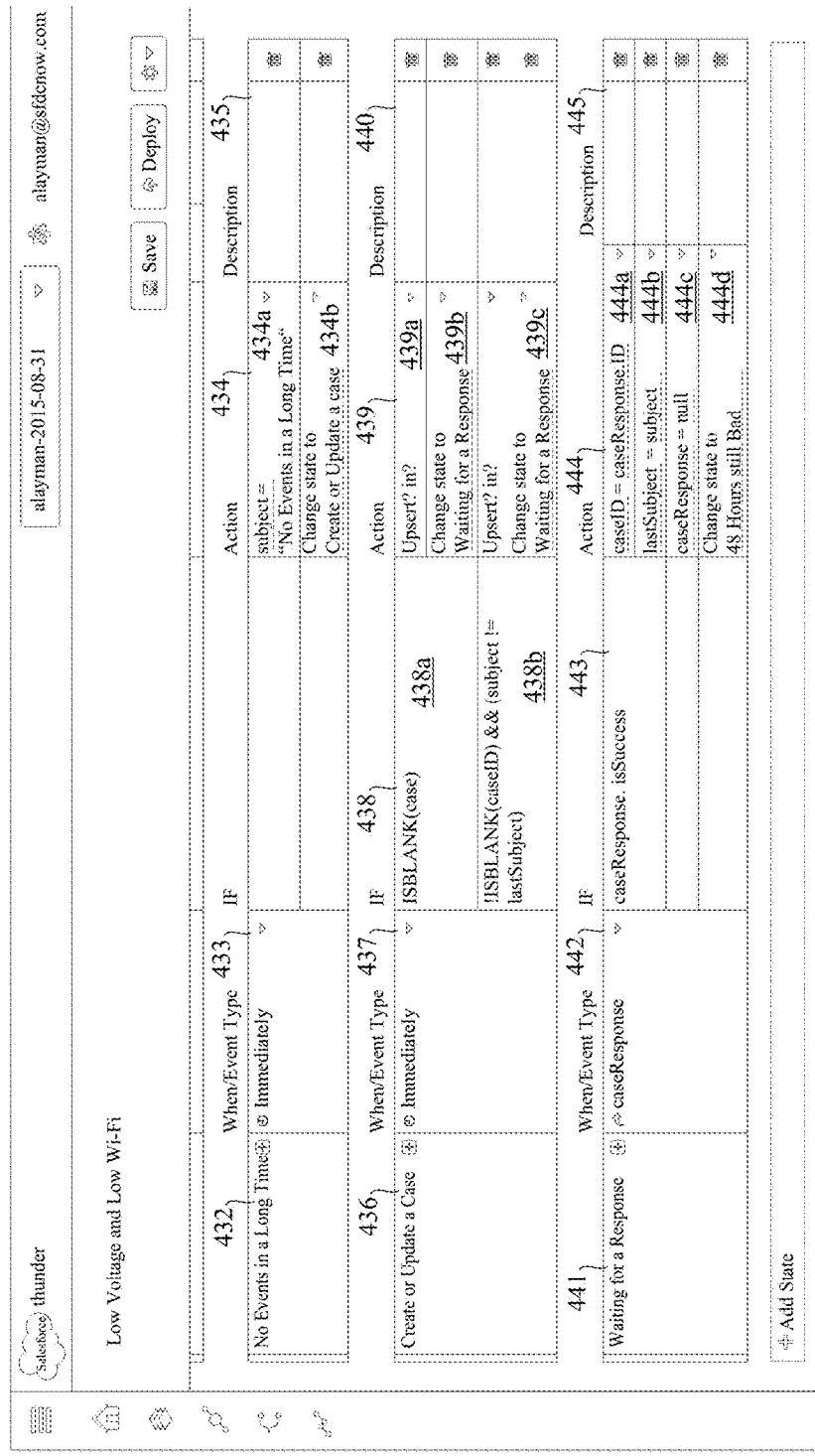

FIG. 4A, FIG. 4B and FIG. 4C show a date entry columnar 400A-C that accepts declarative input to create the state processing network illustrated in FIG. 3. More generally, date entry columnar 400A-C allows non-technical users to declaratively design complex state processing networks that represent sophisticated user management and resource provisioning operations, application life cycle management operations (such as Salesforce Thunder™ 401), traffic monitoring operations, activity tracking operations and application modeling operations.

In particular, date entry columnar 400A-C allows non-technical users to easily specify states of the state processing network, time based transition triggers, event-based transition triggers, definitions of conditions and alternative actions responsive to state transitions. In some implementations, date entry columnar 400A-C allows non-technical users to employ simple expressions for specifying the different variables and parameters of the state processing network.

Turning to FIG. 4A, data entry columnar 400A allows users to identify different event based transition triggers 402 for a state processing network. In the example shown in FIG. 4A, an event based transition trigger titled "device event type" 403 is created by selecting one of the option fields from a drop-down menu 404. In another implementation, custom event based transition triggers are created by clicking the "add event type" widget 408. For the device event type trigger 403, the conditions are specified by a non-technical user such that the device event type trigger 403 initiates the ticket workflow of FIG. 3 (referred to as an orchestration in FIG. 4A) upon selection a checkbox 405 by the non-technical user. Further, a condition 406 is set by the non-technical user that is measured against at least one value of a database field that the condition 406 incorporates. The example condition 406 used in FIG. 4A is whether the device's battery levels are low or the device's network connectivity is poor. This example condition 406 can be represented using the following simple expression.

!device.battery_good||!device.wifi_good

When the condition is satisfied, the device event type trigger 403 is executed. In other implementations, a description 407 of the device event type trigger 403 is received from the non-technical user.

Advancing further, different variables 409 (e.g., deviceID, caseResponse, subject, lastSubject, caseID) used in the condition definitions of data entry columnar 400A are specified by the non-technical user and mapped to respective event based transition triggers 410. In one implementation, the respective conditions 411 that incorporate the variables 409 are also identified by the non-technical user. In another implementation, respective values 412 for the variables 409 are specified by the non-technical user along with an initial value description 413 of the respective variables 409. In addition, custom variables can be created by clicking the "add variable" widget 414. The above mentioned specifications can be made using declarative or visual inputs such as simple expressions, drop-down menus, check-boxes, drag-drop features, and the like.

Furthermore, the non-technical user can identify the different states (e.g., always, started, 48 hours still bad, no events in a long time, create or update a case, waiting for a response) of a state processing network using columnar 415. The non-technical user can also link to a particular state via columnar 415 with the transition triggers 416 that cause transition from that state to another state, the conditions 417, which when satisfied, execute the transition triggers 416, and the actions 418 to take in response to the transition triggers 416. In other implementations, a description 419 of the Always states in columnar 415 and its triggers, conditions and actions are received from the non-technical user. The above mentioned specifications can be made using declarative or visual inputs such as simple expressions, drop-down menus, check-boxes, drag-drop features, and the like. The particular state definition depicted in FIG. 4A shows that a global state titled "Always" is created (Success in FIG. 3). The always rules are satisfied when the conditions of the device's battery levels are good and the device's network connectivity is good are satisfied. This example condition is represented using a simple expression as:

device.battery_good && device.wifi_good.

When the condition is satisfied, the success state is maintained.

Turning to the started state 420 shown in FIG. 4B, the non-technical user specifies a day 3 timer type trigger 421 such that when the event stream confirms that the device error has not been fixed for three days since it was detected, then action 423 is executed, i.e. transition of the started state 420 to 48 hours still bad state 425. In other implementations, a description 424 of the started state 420 and its triggers, conditions and actions is received from the non-technical user.

For the 48 hours still bad state 425 depicted in the data entry columnar 400B of FIG. 4B, the non-technical user specifies two transition triggers—a device event type trigger 426 caused by the satisfaction of condition 427 and a day 5 timer type trigger 430 caused by the fact that the device error has not been fixed for five days since it was detected. The example condition 427 depicted in FIG. 4B includes three different sub-conditions 427a-c i.e. first sub-condition 427a being whether the device's battery levels are low and the device's network connectivity is poor; second sub-condition 427b being whether just the device's battery levels are low; and third sub-condition 427c being whether just the device's network connectivity is poor. The example condition 427 and its sub-conditions 427a-c are represented by simple expressions respectively specified by the non-technical user as:

!device.battery_good && !device.wifi_good
!device.battery_good
!device.wifi_good If any one of these sub-conditions is met, then action 428 is executed. Action 428 includes three different sub-actions 428a-c that respond individually to at least one sub-condition 427a-c of the example condition 427. The first sub-action 428a is responsive to first sub-condition 427a and creates a subject that states that the device's battery levels are low and the device's network connectivity is poor. The second sub-action 428b is responsive to second sub-condition 427b and creates a subject that states that just the device's battery levels are low. The third sub-action 428c is responsive to third sub-condition 427c and creates a subject that states that just the device's network connectivity is poor.

In addition to the three sub-actions 428a-c, action 428 also includes a "must action" 428d that causes state transition of the 48 hours still bad state 425 to create or update a case state 436. The must action is executed regardless of which ones of the sub-conditions 427a-c are met or the sub-actions 428a-c executed, according to one implementation. The example action 428 and its sub-actions 428a-c and must action 428d are represented by simple expressions respectively specified by the non-technical user as:

subject = "Battery voltage low and weak Wi-Fi"
subject = "Battery voltage low"
subject = "Wi-Fi weak"
Change state to Create or Update a case Further, when a day 5 timer type trigger 430 times-out, action 431 is executed, which causes transition of the 48 hours still bad state 425 to no events in long time state 432. The example action 431 is represented by a simple expression specified by the non-technical user as:

Change state to No Events in a Long Time

In other implementations, a description 429 of the 48 hours still bad state 425 and its triggers, conditions and actions is received from the non-technical user. All the above mentioned specifications can be made using declarative or visual inputs such as simple expressions, drop-down menus, check-boxes, drag-drop features, and the like.

For no events in long time state 432 depicted in the data entry columnar 400C of FIG. 4C, the non-technical user specifies an immediate timer type trigger 433 that causes an immediate state transition from the no events in long time state 432 to the create or update a case state 436. The action 434 executed in response to the trigger 433 includes two sub-actions 434a and 434b. The first sub-action 434a creates a subject that states that no event have been registered in a long time. The second sub-action 434b is a "must action" and causes the state transition. The example action 434 and its sub-action 434a and must action 434b are represented by simple expressions respectively specified by the non-technical user as:

subject = "No Events in a Long Time"
Change state to Create or Update a case

In other implementations, a description 435 of the no events in long time state 432 and its triggers, conditions and actions is received from the non-technical user. All the above mentioned specifications can be made using declarative or visual inputs such as simple expressions, drop-down menus, check-boxes, drag-drop features, and the like.

For create or update a case state 436, the non-technical user specifies an immediate timer type trigger 437 that causes an immediate state transition from the create or update a case state 436 to the waiting for a response state 441. However, here the immediate timer type trigger 437 is caused by the satisfaction of condition 438. The example condition 438 includes two sub-conditions 438a and 438b. The first sub-condition 438a evaluates whether fields of a created case form are blank. The second sub-condition 438b evaluates whether fields of a last created case form are filled and whether the subject being evaluated is the subject of the last created case.

The example condition 438 and its sub-conditions 438a-b are represented by simple expressions respectively specified by the non-technical user as:

```
ISBLANK(case)
!ISBLANK(caseID) && (subject != lastSubject)
```

If at least one of the sub-conditions 438a-b is met, then action 439 is executed. Action 439 includes sub-actions 439a, 439b and 439c and causes state transition to the waiting for a response state 441.

The example action 439 and its sub-action 439a-c are represented by simple expressions respectively specified by the non-technical user as:

```
Upsert? in?
Change state to Waiting for a Response
Upsert? in? Change state to Waiting for a Response
```

In other implementations, a description 440 of the create or update a case state 436 and its triggers, conditions and actions is received from the non-technical user. All the above mentioned specifications can be made using declarative or visual inputs such as simple expressions, drop-down menus, check-boxes, drag-drop features, and the like.

For waiting for a response state 441, the non-technical user specifies a case response event type trigger 442, which confirms that a case response was received. Case response event type trigger 442 is caused by the satisfaction of condition 443 that evaluates whether the case response was successfully registered.

If condition 443 is met, action 444 is executed. Action 444 includes sub-actions 444a, 444b, 444c and 444d and causes state transition to 48 hours still bad state 425.

The example action 444 and its sub-action 444a-d are represented by simple expressions respectively specified by the non-technical user as:

```
caseID = caseResponse.ID
lastSubject = subject
caseResponse = null
Change state to 48 Hours still Bad
```

In other implementations, a description 445 of the waiting for a response state 441 and its triggers, conditions and actions is received from the non-technical user. All the above mentioned specifications can be made using declarative or visual inputs such as simple expressions, drop-down menus, check-boxes, drag-drop features, and the like.

In other implementations, state processing networks and data entry columnar based on different use cases and operations can be implemented, some which are discussed infra as particular implementations.

In other implementations, state processing networks and data entry articulations based on different use cases and operations can be implemented. For example, a GUI display articulation could be devised with a diagrammatic approach such as that seen in FIG. 3, with a GUI for adding data such as that discussed supra for FIG. 4A-4C. Non-technical users could enter data via the state diagram display articulation.

The above implementations are only exemplary and can be similarly applied in another programming language, be it high-level programming language, low-level programming language, functional programming language, markup programming language or imperative programming language, as listed supra.

Figure 4D:
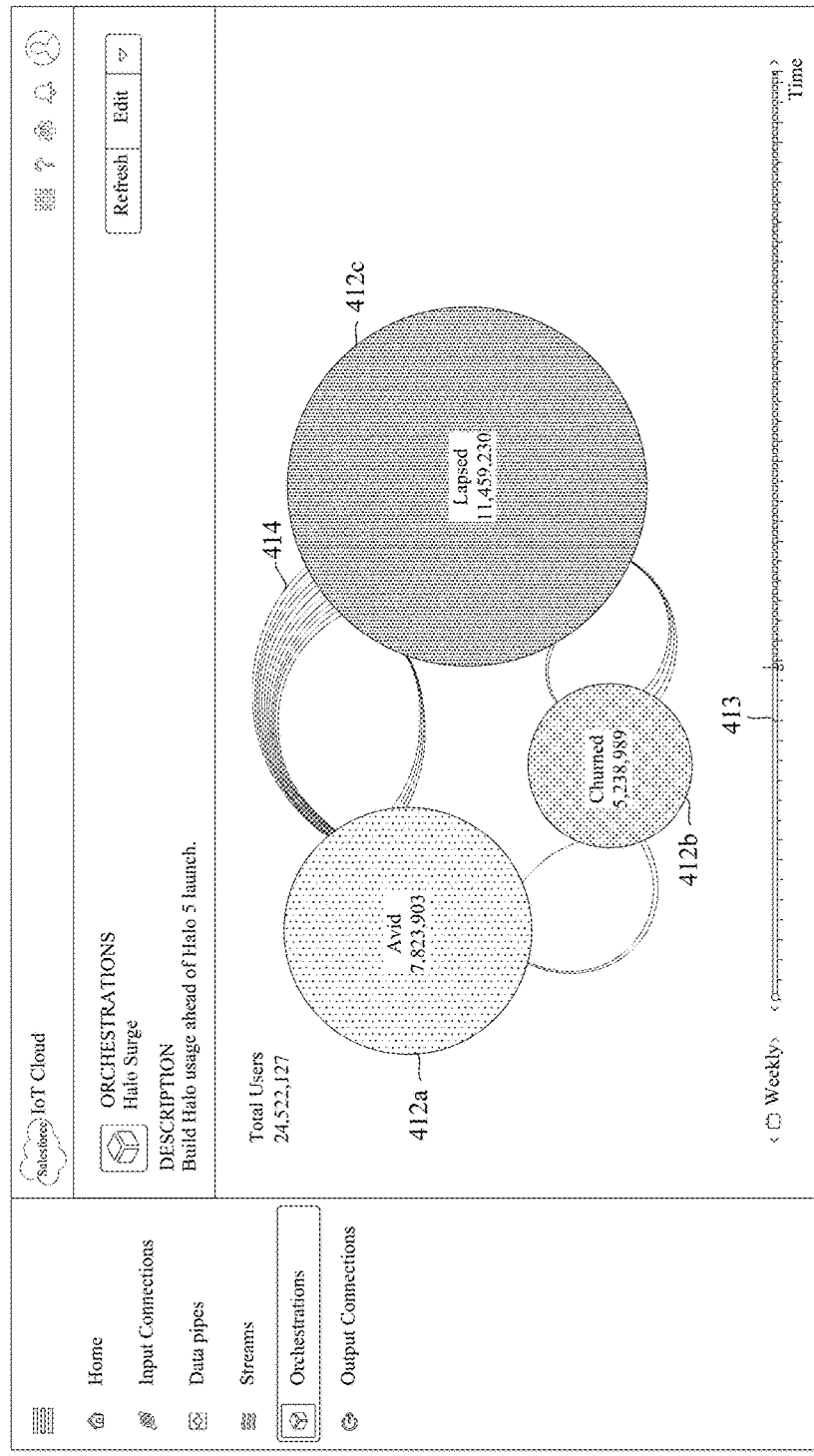
FIG. 4D depicts a bubble implementation of categorizing a plurality of entities into multiple state types.

FIG. 4D depicts a bubble implementation 400D of categorizing a plurality of entities into multiple state types 412a, 412b and 412c based on respective entity activity levels. In the bubble implementation, the different state types are represented as bubbles and the state transitions are represented as arches. In particular, FIG. 4D shows that Halo gamers are categorized into three states: avid 412a (who play more than fours a week), churned 412b (who play less than one hour a week) and lapsed 412c (who play between one and four hours a week). State transitions from one state to another are displayed using arches 414. In addition, size of a state type, i.e. circle, represents a number of entities belonging to a particular state type. Furthermore, a replay control 413 allows for replay over time to visualize transition of entities among the state types.

According to one implementation, the visual coding (e.g., colors, size, a heat map, number of filled or open bars, dimming effects, varying patterns and schemes, distinctive shapes) of the transition trails, i.e. arches 414, matches the visual coding of corresponding final bubbles i.e. state types 412a, 412b and 412c. Such an implementation utilizes the real-time morphing animations implemented by orchestration 112, as discussed supra.

Figure 4E:
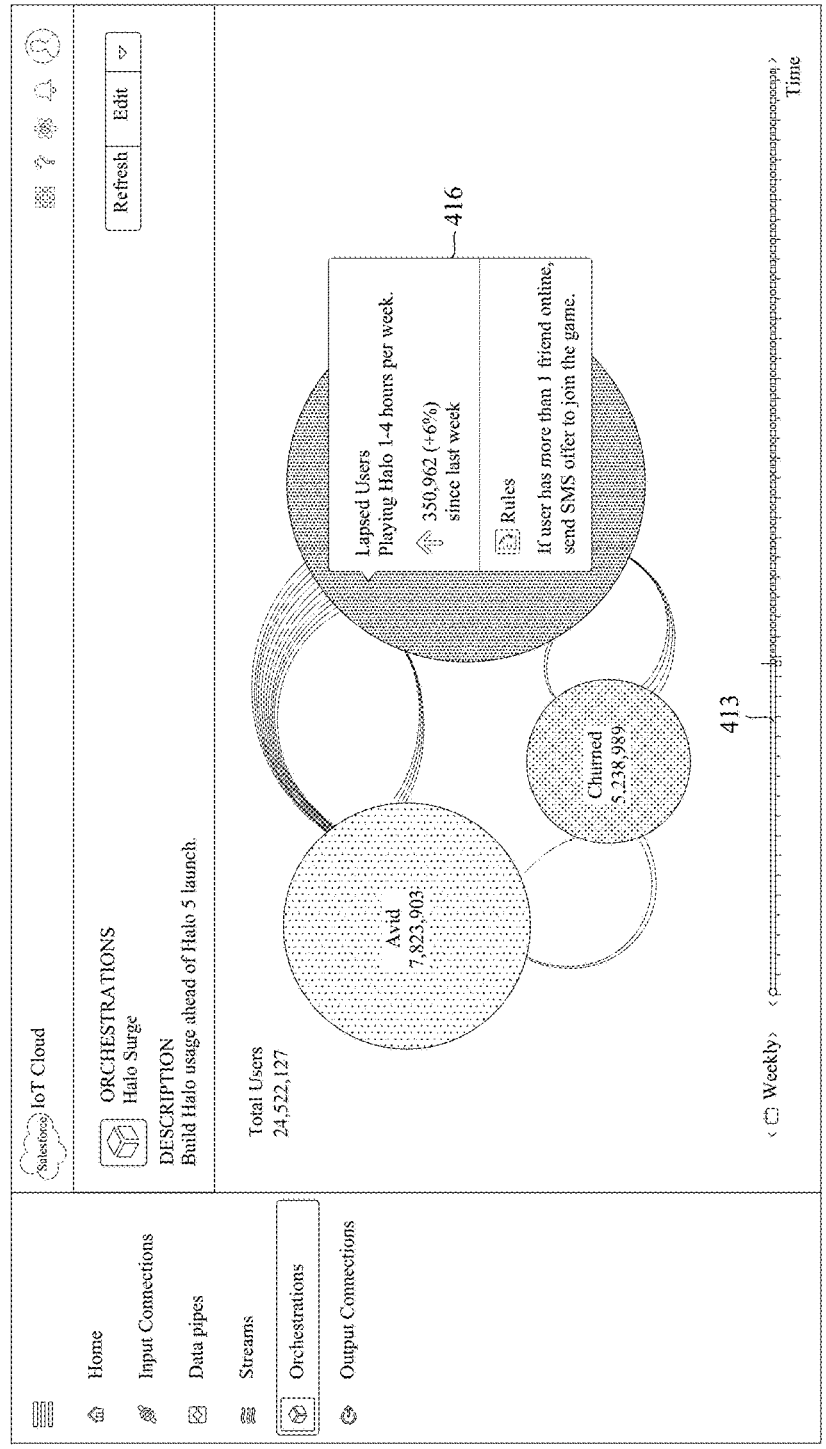
FIG. 4E shows a hover panel in accordance with an implementation of the technology disclosed.

FIG. 4E shows a hover panel 400E in accordance with an implementation of the technology disclosed. In particular, a display hover panel 400E is generated in FIG. 4E upon navigation of the state types. The hover panel identifies state data 416 for a selected state type. State data 416 includes criteria for categorizing entities in the state types, a number of entities in the state type, a change in the number over a time period, and conditions that control selectable actions to implement, responsive to state transitions. In the example shown in FIG. 4E, churned state includes gamers that play Halo games between one and fours hour per week and if such users have more than one friend online, then an SMS offer is sent to them to join the Halo games.

Figure 4F:
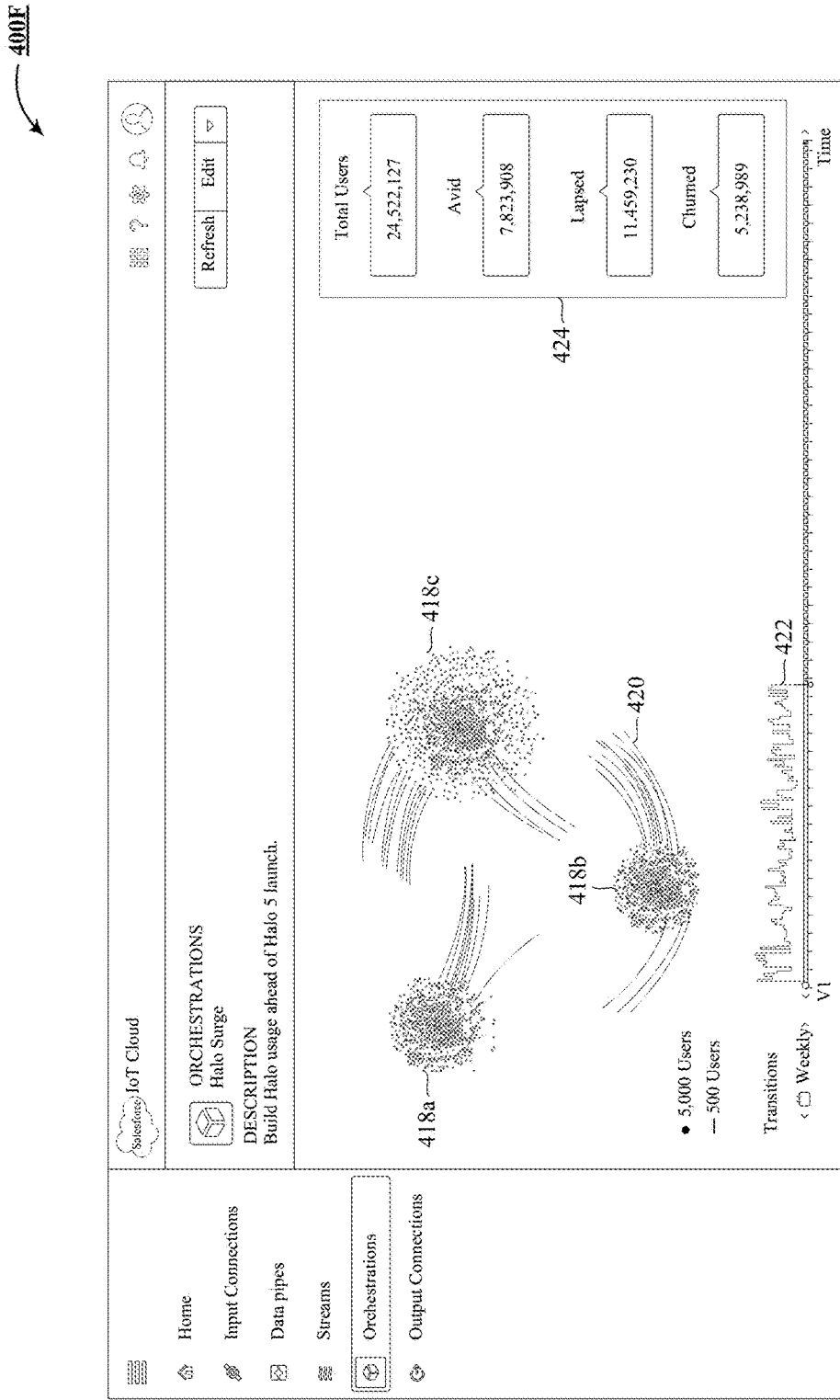
FIG. 4F depicts a cloud or dot cloud implementation of categorizing a plurality of entities into multiple state types based on respective entity activity levels.

FIG. 4F depicts a cloud or dot cloud implementation 400F of categorizing a plurality of entities into multiple state types 418a, 418b and 418c based on respective entity activity levels. In the cloud or dot cloud implementation, the different state types are represented as clouds or dot clouds and the transition trails are represented as arches. In particular, FIG. 4F shows that Halo gamers are categorized into three states: avid 418a (who play more than fours a week), churned 418b (who play less than one hour a week) and lapsed 418c (who play between one and four hours a week). State transitions from one state to another are displayed using trails 420. In addition, sizes of the state types i.e. clouds or dots within a cloud represents a number of entities belonging to a particular state type. Furthermore, a replay control 422 allows for replay over time to visualize transition of entities among the state types.

According to one implementation, the visual coding (e.g., colors, size, a heat map, number of filled or open bars, dimming effects, varying patterns and schemes, distinctive shapes) of the transition trails i.e. trails 420 matches the visual coding of corresponding final clouds or dot clouds i.e. state types 418a, 418b and 418c. Such an implementation utilizes the real-time morphing animations implemented by the orchestration 112, as discussed supra.

In one implementation, a current number of users in each of the state types are displayed in tabular 424, which are mapped to the real-time event streams and are updated as entities transition from one state to another using the real-time morphing animations implemented by orchestration 112, as discussed supra.

FIG. 4G illustrates one implementation of state morphing 400G using a replay control 428 that visualizes transition of entities among the state types. In particular, FIG. 4G shows that the current number of users in each of the state types is displayed in updated tabular 430. In addition, the sizes of the respective state types have changed in response to entities transitioning from one state to another and can be mapped to the real-time event streams using the real-time morphing animations implemented by orchestration 112, as discussed supra.

All the above mentioned specifications can be made using declarative inputs or visual inputs such as simple regular expressions, drop-down menus, check-boxes, drag-drop features, and the like.

Figure 5:
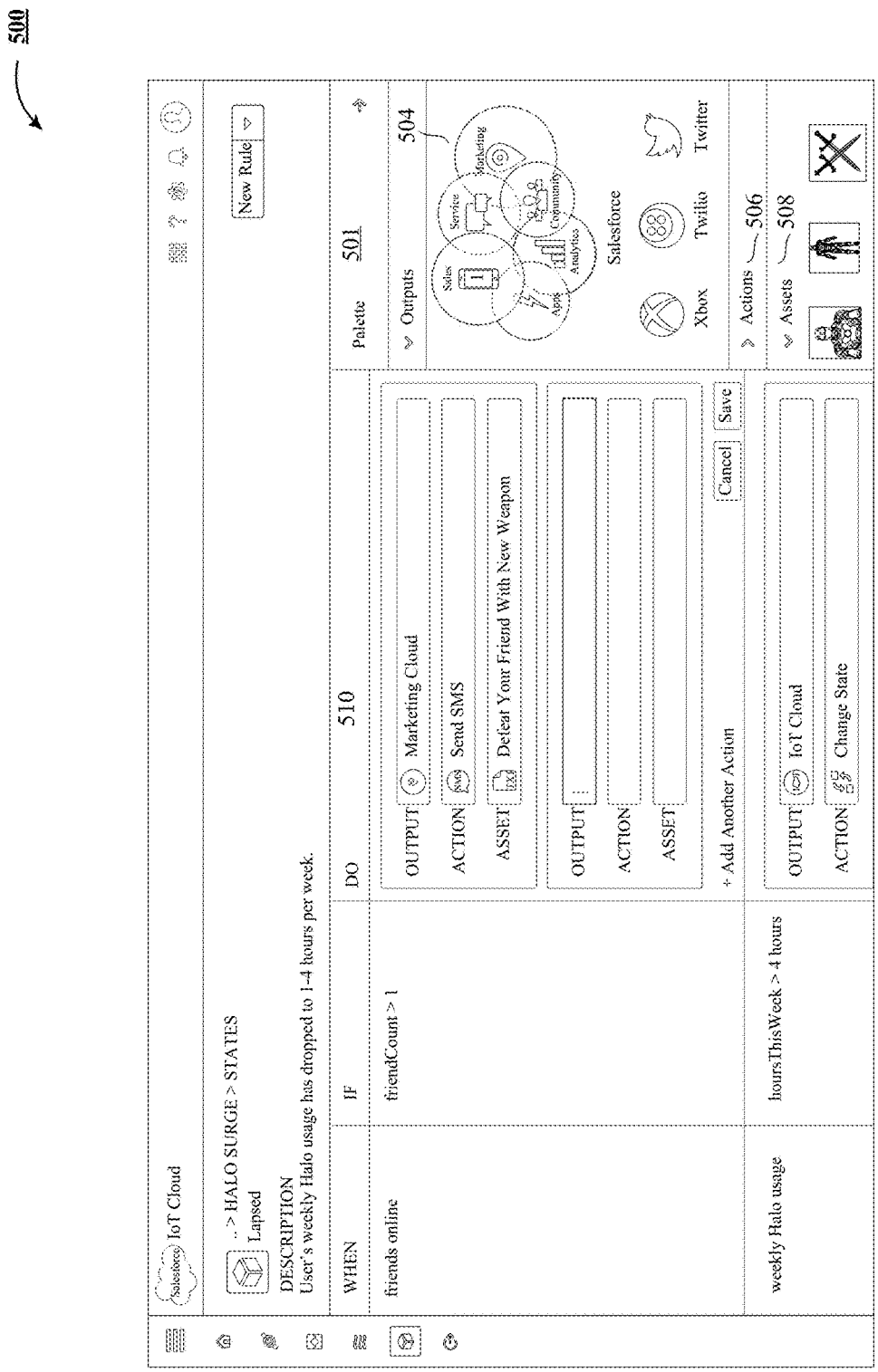
FIG. 5 illustrates one implementation of a data entry columnar that accepts declarative input.

FIG. 5 illustrates one implementation of a data entry columnar 500 that accepts declarative input. In particular, FIG. 5 allows a non-technical user to create a multi-step progression of interaction with an entity using declarative and visual input palette 501. In one implementation, data entry columnar 500 includes selectable transition-responsive actions 506 which specify an output messaging channel 504 (e.g., SMS, push message notification, type of application (e.g. Salesforce1 Platform™, Sales Cloud™, Data.com™, Service Cloud™, Desk.com™, Marketing Cloud™, Pardot™, Wave Analytics™, Box.net™, Dropbox™, Google Apps™, Amazon AWS™, Microsoft Office 365™), a messaging action 510 and an asset 508 to retrieve and include in a message produced by the messaging action 510.

In the example shown in FIG. 5, a non-technical user like a marketer or sales representative automates an interaction path for lapsed gamers. This automated interaction path includes sending an SMS to any entity that qualifies as a lapsed gamer via a marketing application. The SMS also includes a gaming gift for the lapsed gamer. All these specifications can be made using declarative or visual inputs such as simple regular expressions, icons, graphic objects and widgets, drop-down menus, check-boxes, drag-drop features, and thus allowing the non-technical user to easily set interaction automations with a particular kind of entities.

The above implementations are only exemplary and can be similarly applied in another programming language, be it high-level programming language, low-level programming language, functional programming language, markup programming language or imperative programming language, as listed supra.

Monitoring IoT Devices

Schneider Electric™ creates smart uninterruptible power supply (UPS) devices that are usually deployed to clients in bulk under a so-called device deployment scheme. These smart UPSs periodically provide status information to a server or a host, which process the status information and determine whether the smart UPSs are suitable for the client location or client site where they are deployed. In some cases, a mismatch between a device type and a deployment scheme occurs when the deployed devices suffer regular break downs or other failures. In the example of smart UPSs, when a certain number of deployed UPSs provide status information that shows that the UPSs are suffering voltage outages or unusual voltage spikes on a regular basis, then this indicates that the deployed UPSs are not best suited for the client site, either due to the electric set up on the client site, or because the client's infrastructure is overwhelming the UPSs, or some other reason. As a result, Schneider Electric™ can inspect the product line or the product batch associated with the deployed UPSs to determine whether there is systemic issue.

Accordingly, the technology disclosed implements the state processing network discussed supra to process events generated by IoT devices like smart UPSs and determines whether a potential mismatch has occurred between the IoT devices and a device deployment scheme for a given client. In one implementation, the technology disclosed does so by compiling data structures of an anomalous event generated by a particular IoT like a smart UPS. Then, data structures pertaining to event history of other smart UPSs deployed with the particular IoT are compiled to determine whether there is a pattern of the anomalous event amongst the other IoT devices. If a pattern is found, then a potential mismatch is inferred.

Emerson Electric Co.™ creates smart thermostat devices that periodically provide their status information to a server or host, which can process this status information and determine the health of the smart thermostat devices. In some implementations, each IoT device like a smart thermostat provides it status information numerous times every hour or every minute. In such cases, the challenge becomes to identify which status updates are actionable because they pose a systemic and lasting issue, and which ones are temporary and would automatically or easily be resolved over time. For example, when a smart thermostat conveys that it is suffering from low-Wi-Fi connectivity, then such an issue may not be actionable because the Wi-Fi connectivity undergoes cycles of low and high signals due to reasons not originating from the smart thermostat and outside the control of Emerson Electric Co.™ (e.g. power outage, tower traffic, site traffic, etc.). However, if the smart thermostat maintains its state of low-Wi-Fi connectivity over a duration of time, then an action is required to determine whether there is a systemic issue with the given smart thermostat that necessitates repair or replacement.

Accordingly, the technology disclosed implements the state processing network discussed supra to process events generated by IoT devices like smart thermostats and detects false positives during management of such devices. In one implementation, the technology disclosed does so by compiling data structures of an anomalous event generated by a particular IoT device like a smart thermostat. Then, data structures pertaining to event history of the smart thermostat are compiled to determine whether there is a pattern of the anomalous event in the event history over a time window. If a pattern is not found, then a false positive is inferred.

Data Structures for IoT Device Data

The following tables shows various examples of data structures that record monitoring status of particular IoT devices.

| Inputs | |
|---|---|
| device data | event steam |
| battery | Event |
| wifi | event |
| decomissioned | event |
| $response | event |
| lowBattery | event |
| lowWifi | event |
| $deviceID | device identifier |

-continued

| Inputs | |
|---|---|
| $isDecommissioned | decommissioned |
| $caseID | case identifier |
| $subject | subject identifier |
| $lastSubject | last subject identifier |
| battery.icd_id | battery identifier |
| UPS | event type |
| caseResponse | event type |
| opptyResponse | event type |
| BatteryCondition | state type |
| Overload | state type |
| update | state type |
| online | state type |
| offline | state type |
| Hour | timer trigger |
| Day | timer trigger |
| Count Days | timer trigger |
| Low WiFi | state type |
| Always | state type |
| wifi_connection_quality | state type |
| avg_wifi_connection_quality | state type |
| wifi_threshold | event type |
| BatteryEvents | event type |
| OverloadEvents | event type |

| States - No case yet. |
|---|
| lowBattery && lowWifi |
| lowBattery && NOT lowWifi |
| NOT lowBattery && lowWifi |
| NOT lowBattery && NOT lowWifi |
| $isDecommissioned |

| States - Creating a case. |
|---|
| $response.isSuccess |
| NOT ISBLANK($caseID) |
| $subject NOT = $lastSubject |
| ISBLANK($caseID) |
| $isDecommissioned |

| States - Have a case. |
|---|
| $isDecommissioned |
| lowBattery && lowWifi |
| lowBattery && NOT lowWifi |

| Actions - No case yet. |
|---|
| $subject = "Battery voltage and Wi-Fi for device " & $deviceID & " is low." |
| $response = Salesforce.Create( |
| SObjectType="Case", |
| Subject=$subject) |
| Change State To "Creating a case" |
| $subject = "Battery voltage for device " & $deviceID & " is low." |
| $subject = "Wi-Fi for device " & $deviceID & " is low." |
| Terminate("success") |
| Terminate("not applicable") |

| Actions - Creating a case. |
|---|
| $caseID = $response.ID |
| $lastSubject = $subject |
| ChangeStateTo("Have a case") |
| Change State To "No case yet" |
| ChangeStateTo("Have a case") |

| Actions - Have a case. |
|---|
| $response = Salesforce.Update( |
| CaseNumber=$caseID, |
| Status="Closed") |
| Terminate("not applicable") |
| $subject = "Battery voltage for device " & $deviceID & " is low." |
| $response = Salesforce.Update( |
| CaseNumber=$caseID, |
| Status=$subject) |
| $subject = "Battery voltage and Wi-Fi for device " & $deviceID & " is low." |

| UPS Data Structures |
|---|
| UPS.Battery_Status != "Normal" && |
| (Profile.warrant_end_date − Expiry_Window < TODAY ( )) |
| UPS.Battery_Status != "Normal" && |
| (Profile.warrant_end_date − Expiry_Window >= TODAY ( )) |
| UPS.Battery_Status = "Normal" |
| Spike_Count > Allowable_Overloads |
| Spike_Count > High_Overloads |
| SFDC.CaseStatus = "Closed" |
| Rolling_Overload_Count = 0 |
| CaseStatus != "Closed" |
| UPS.Battery_Voltage > Max_Voltage_Threshold |
| IF Battery Events + OverloadEvent >= 10 |
| ISBLANK(OpptyID) = true |
| ISBLANK(OpptyID) = !true |
| opptyResponse.isSuccess = true |
| opptyResponse.isSuccess = false |
| ISBLANK(OpptyID) = false |
| wifi_connection_quality < wifi_threshold |
| wifi_connection_quality > wifi_threshold |
| avg_wifi_connection_quality > 0 && |
| avg_wifi_connection_quality < wifi_threshold |
| avg_wifi_connection_quality > wifi_threshold |
| wifi_connection_quality > 25 |

FIG. 10 shows one implementation of a state processing network 1000 for managing smart uninterruptible power supply (UPS) devices based on a battery parameter.

Figure 11:
FIG. 11 depicts one implementation of a state processing network that connects a customer relationship management (CRM) platform to the monitoring of smart UPS devices shown in FIG. 10.

FIG. 11 depicts one implementation of a state processing network 1100 that connects a customer relationship management (CRM) platform to the monitoring of smart UPS devices shown in FIG. 10.

Figure 12:
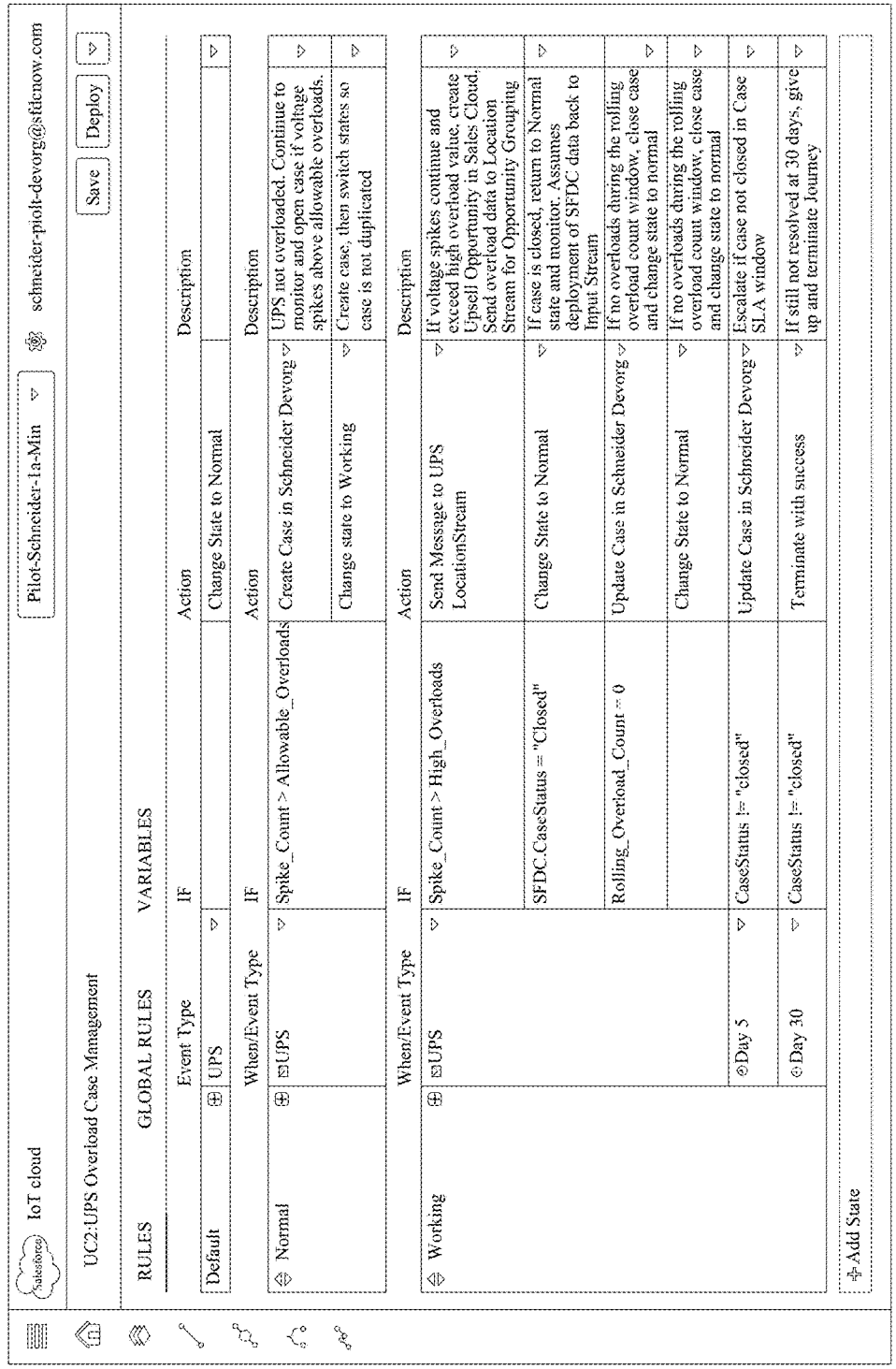
FIG. 12 illustrates one implementation of a state processing network for managing smart uninterruptible power supply (UPS) devices based on a voltage parameter and connecting monitoring of the smart UPS devices to a CRM platform.

FIG. 12 illustrates one implementation of a state processing network 1200 for managing smart uninterruptible power supply (UPS) devices based on a voltage parameter and connecting monitoring of the smart UPS devices to a CRM platform.

FIG. 13 is one implementation of a state processing network 1300 for managing smart uninterruptible power supply (UPS) devices based on battery and voltage parameters and connecting monitoring of the smart UPS devices to a CRM platform.

FIGS. 14A, 14B and 14C depict one implementation of a state processing network 1400A, 1400B and 1400C for managing smart uninterruptible power supply (UPS) devices based on battery and voltage parameters and connecting monitoring of the smart UPS devices to a CRM platform using time based triggers.

FIG. 15 shows one implementation of a state processing network 1500 for managing smart uninterruptible power supply (UPS) devices over a time duration based on battery and voltage parameters.

FIGS. 16A, 16B and 16C illustrate one implementation of a state processing network 1600A, 1600B and 1600C for managing smart uninterruptible power supply (UPS) devices based on WiFi voltage parameter and connecting monitoring of the smart UPS devices to a CRM platform.

Entity Churn Management Program

The Microsoft™ consumer application services group leads Microsoft's business across productivity, communications, education, search and other information services, setting the vision, strategy and overall direction of the applications and services group. The marketing team for Microsoft's consumer applications & services (CAS) group oversees and coordinates all marketing activities related to Microsoft's consumer offerings for Office™, Exchange™, Yammer™, OneDrive™ (SkyDrive™), Skype™, Lync™, Bing™, MSN™, and Outlook.com™ (Hotmail™).

Further, the Microsoft Office 365™ business accounts for the majority of the revenue generated by this group of products, estimated to be at roughly a $4 billion per year run rate. With nearly $50 million active, paying users, one of CAS's most important initiatives is user retention. Each percentage point of user churn equates to $30 million in revenue swing (won/lost). Given that subscription businesses have an average annual churn rate between 25-50%, this means between $1-2 billion of annual revenue is at risk.

The CAS team implements a variety of churn management programs in an effort to retain and, when necessary, regain their most loyal users. These churn programs target users with various offers who are either in the process of churning or who have just churned. Because such programs often have a high rate of false positives (users who appear to be at risk of churning, but who do not actually cancel) and because program efficacy requires financial incentives and offers to retain users, it is important that CAS only target its highest value users with these initiatives.

In order to target only the highest value Office 365™ users, an entity lifetime value score is calculated for each user. This score is calculated by factoring in a given user's actual revenue generation to date, his/her retention characteristics, and the cost to serve said user. The specific factors for each of these three areas include:

Revenue:
  Annual purchase or renewal:—Number of times a user purchases or renews an annual subscription.
  Monthly purchase or renewal:—Number of times a user purchases or renews a monthly subscription.
  Delay in renewal:—Number of total days between the expiry date and the late renewal date over the life of the user.
Retention:
  Annual auto-renew:—Currently enrolled in an annual auto-renew subscription.
  Monthly auto-renew:—Currently enrolled in a monthly auto-renew subscription.
  Office usage:—Level of usage (high, medium, low, non-usage) of
  Office applications (Word™, PowerPoint™, Excel™, OneNote™) over entity lifetime.
  Other services usage:—Level of usage (high, medium, low, non-usage) of other Office 365™ services (OneDrive Storage™, Office™ for iOS™, Office™ for Android™, Skype™) over entity lifetime.
  Trial conversation:—User converted from a free-trial of Office 365™.
  Purchase channel:—User purchased Office 365™ directly from Microsoft™, as opposed to from a retail or original equipment manufacturer (OEM) partner.
Cost:
  Purchase channel:—User purchased Office 365™ via a retail or OEM partner, as opposed to directly from Microsoft™.

Using the above parameters, the users are segmented into six entity lifetime value tiers that are utilized to determine which offer a user receives, according to one implementation of the technology disclosed.

Figure 6:
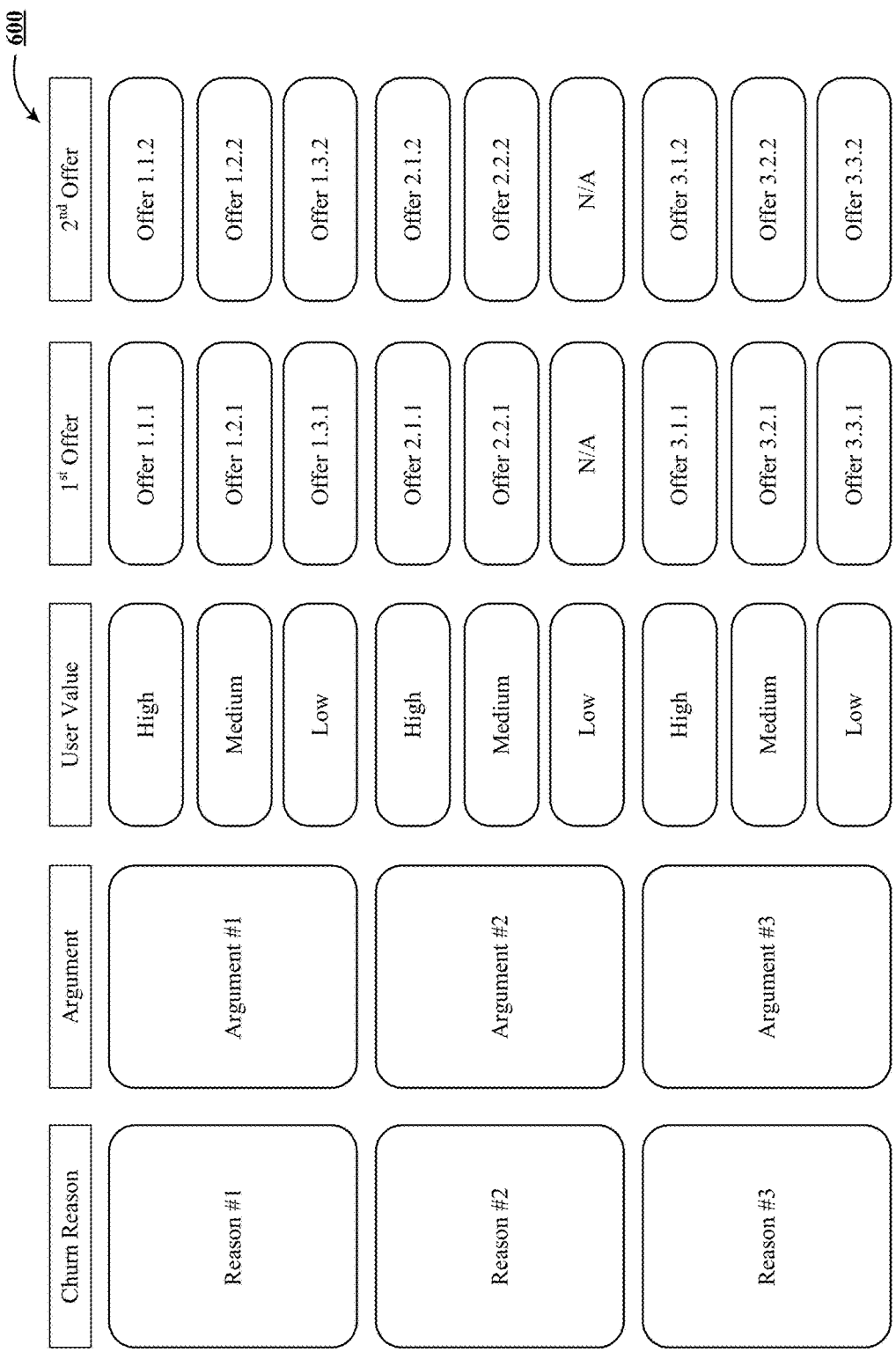
FIG. 6 depicts one implementation of a state processing network that implements an entity churn program.

The reactive churn programs implemented using the technology disclosed include all actions and engagements designed to retain a user at the time when he or she proactively demonstrates an intention to cancel his or her subscription. These programs are executed when a user initiates a cancellation request or activity online via a platform like Office.com™. Using e-mail as well as in-application notifications, which, according to one implementation, are delivered to the business bar of the applications like Word™, PowerPoint™, Excel™ OneNote™, etc., targeted content, incentives and offers are delivered based upon a user's reason for cancelling as well as the user's lifetime value score and tier, as depicted in the state processing network 600 shown in FIG. 6.

In one implementation, upon receiving a subscription cancellation request, targeted offers are delivered via e-mail based on the following rules:
  If subscription is cancelled and user has a high entity lifetime value score (Tier 1 or Tier 2), then send e-mail with targeted high-value offer.
  If subscription is cancelled and user has a medium entity lifetime value score (Tier 3 or Tier 4), then send e-mail with targeted low-value offer.
  If subscription is cancelled and user has a low entity lifetime value score (Tier 4 or Tier 5), then send follow up e-mail with no offer.

Data Structures for Entity Lifetime Value

The following tables shows various examples of data structures that record an entity lifetime value of users.

| Persona - This includes contact e-mail addresses, details, language and opt-in preferences of each account owner for a mixture of new accounts and updates to existing accounts. | |
|---|---|
| puid | source system natural key (hex string) |
| puidint | integer representation of PUID (int) |
| email | contact email address (obfuscated) |
| lcidname | locale (string) |
| language | communication language preference |
| countrycode | country of origin of this contact |
| isemailcommunicationsuppressed | has contact declined to receive email communications |
| sourcesystemname | originating system name |
| lastmodifieddate | event date |

| Communication - This includes opt-in preference for each communication publication by Persona for both new events and updates to existing preferences. | |
|---|---|
| puid | Persona FK (hex string) |
| puidint | integer representation of PUID (int) |
| communicationpublicationid | source system natural key |
| Communicationpublicationname | name of message/publication |

| | |
|---|---|
| Communication - This includes opt-in preference for each communication publication by Persona for both new events and updates to existing preferences. | |
| communicationchannelid | source system natural key |
| communicationchannelname | name of messaging channel, e.g. email, SMS |
| isoptin | is user opted in or out from communication |

| | |
|---|---|
| Subscription - This includes product and subscription details for each subscription associated with a Person, for both new events and updates to existing details. | |
| SubscriptionKey | source system natural key |
| CtpBdkId | hash of subscription key |
| Puid | persona FK (hex string) |
| PuidInt | integer representation of PUID (int) |
| OriginalTrialSubscriptionStartDate | 1st trial begin date |
| OriginalPaidSubscriptionStartDate | 1st paid date |
| OriginalPromoSubscriptionStartDate | if promo, begin date |
| OriginalPerpetualSubscriptionStartDate | if perpetual, begin date |
| OriginalOtherSubscriptionStartDate | if other, begin date |
| SubscriptionCreatedDate | min of the above |
| SubscriptionStartDate | current subscription begin date |
| SubscriptionEndDate | current subscription end date |
| BillingStatusName | paid subscription status |
| CancellationCode | reason for cancellation |
| BillingOfferName | Office product name |
| CountryName | subscriber's billing country |
| TrialConversionBillingOfferName | Office trial product name |
| OriginalBillingOfferName | Initial Office product name |
| CancellationDate | Date of subscription cancellation |
| ProductGroup | Office product hierarchy |
| IsTrialConversion | Did subscription begin as a trial? |
| SourceEffectiveDate | event date |
| OriginalProductGroup | Office product hierarchy |
| ProductType | Paid, Trial, Promo categories |
| PipelineProcessingDate | processing metadata |
| PipelineExecutionTicket | processing metadata |

Multi-Tenant Integration

Figure 7:
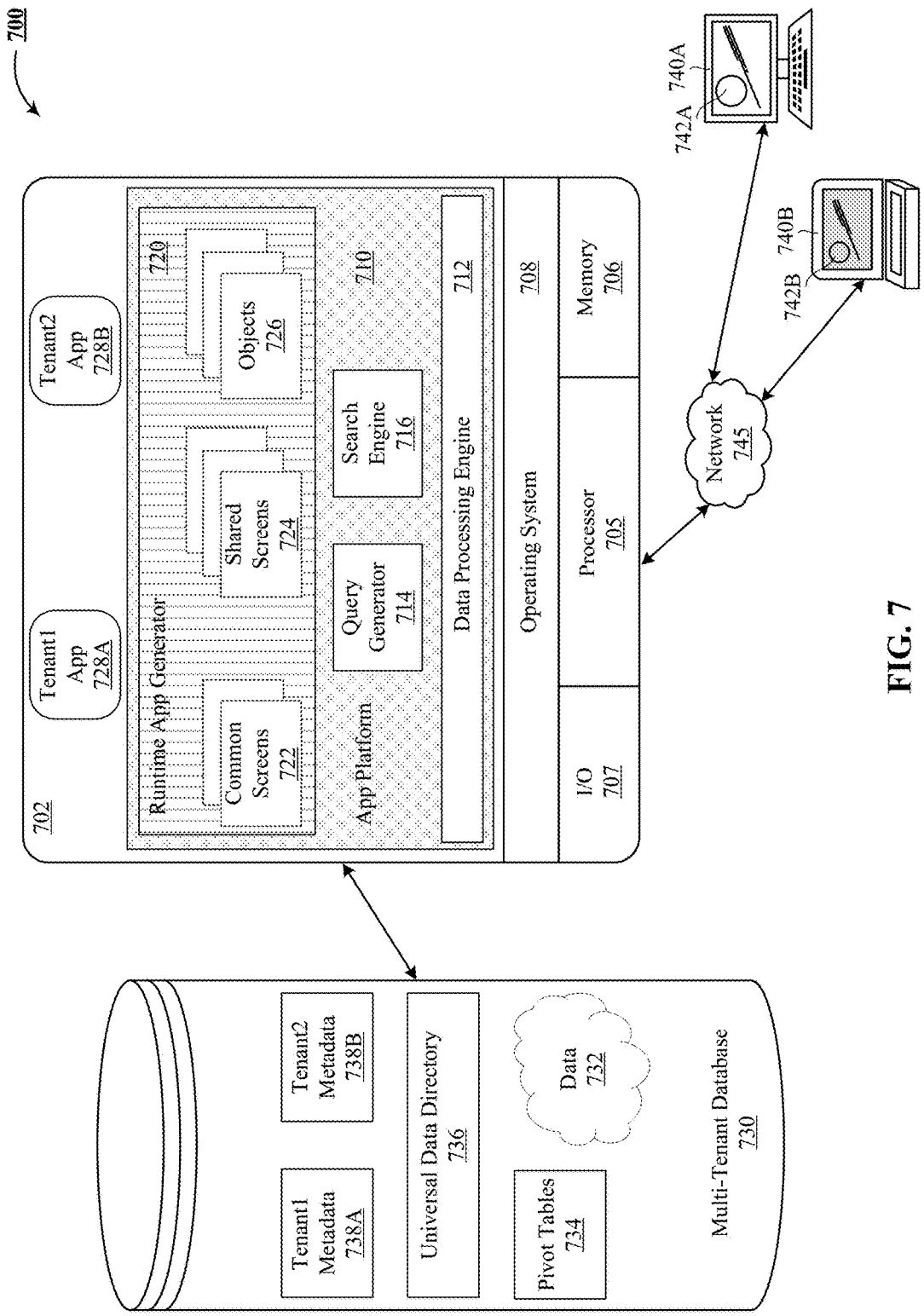
FIG. 7 is a block diagram of an exemplary multi-tenant system suitable for integration with the IoT platform of FIG. 1A in accordance with one or more implementations of the technology disclosed.

FIG. 7 is a block diagram of an exemplary multi-tenant system 700 suitable for integration with in the IoT platform 100A of FIG. 1A in accordance with one or more implementation.

IoT platform 100A of FIG. 1A can be implemented using a multi-tenant system. In that regard, FIG. 7 presents a conceptual block diagram of an exemplary multi-tenant system suitable for integration with the IoT platform 100A of FIG. 1A in accordance with one or more implementations.

In general, the illustrated multi-tenant system 700 of FIG. 7 includes a server 702 that dynamically creates and supports virtual applications 728A and 728B based upon data 732 from a common database 730 that is shared between multiple tenants, alternatively referred to herein as a "multi-tenant database". Data and services generated by the virtual applications 728A and 728B are provided via a network 745 to any number of client devices 740A and 740B, as desired. Each virtual application 728A or 728B is suitably generated at run-time (or on-demand) using a common application platform 710 that securely provides access to the data 732 in the database 730 for each of the various tenants subscribing to the multi-tenant system 700. In accordance with one non-limiting example, the multi-tenant system 700 is implemented in the form of an on-demand multi-tenant user relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. Stated another way, each respective user within the multi-tenant system 700 is associated with, assigned to, or otherwise belongs to a particular tenant of the plurality of tenants supported by the multi-tenant system 700. Tenants may represent users, user departments, work or legal organizations, and/or any other entities that maintain data for particular sets of users within the multi-tenant system 700. Although multiple tenants may share access to the server 702 and the database 730, the particular data and services provided from the server 702 to each tenant can be securely isolated from those provided to other tenants. The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various implementations, the database 730 shares processing hardware 704 with the server 702. In other implementations, the database 730 is implemented using separate physical and/or virtual database server hardware that communicates with the server 702 to perform the various functions described herein. In an exemplary implementation, the database 730 includes a database management system or other equivalent software capable of determining an optimal query plan for retrieving and providing a particular subset of the data 732 to an instance of virtual application 728A or 728B in response to a query initiated or otherwise provided by a virtual application 728A or 728B. The multi-tenant database 730 may alternatively be referred to herein as an on-demand database, in that the multi-tenant database 730 provides (or is available to provide) data at run-time to on-demand virtual applications 728A and 728B generated by the application platform 710.

In practice, the data 732 may be organized and formatted in any manner to support the application platform 710. In various implementations, the data 732 is suitably organized into a relatively small number of large data tables to maintain a semi-amorphous "heap"-type format. The data 732 can then be organized as needed for a particular virtual application 728A and 728B. In various implementations, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, work logic and other constructs that are common to multiple tenants. Tenant-specific formatting, functions and other constructs may be maintained as tenant-specific metadata 738A-B for each tenant, as desired. Rather than forcing the data 732 into an inflexible global structure that is common to all tenants and applications, the database 730 is organized to be relatively amorphous, with the pivot tables 734 and the metadata 738A and 738B providing additional structure on an as-needed basis. To that end, the application platform 710 suitably uses the pivot tables 734 and/or the metadata 738A-B to generate "virtual" components of the virtual applications 728A and 728B to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728A and 728B and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728A and 728B that provide data and/or services to the client devices 740A and 740B. In a typical implementation, the application platform 710 gains access to processing resources, communications interfaces and other features of the processing hardware 704 using any sort of conventional or proprietary operating system 708. The virtual applications 728A and 728B are typically generated at run-time in response to input received from the client devices 740A and 740B. For the illustrated implementation, the application platform 710 includes a bulk data processing engine 712, a query generator 714, a search engine 716 that provides text indexing and other search functionality, and a runtime application generator 720. Each of these features may be implemented as a separate process or other module, and many equivalent implementations could include different and/or additional features, components or other modules as desired.

The runtime application generator 720 dynamically builds and executes the virtual applications 728A and 728B in response to specific requests received from the client devices 740A and 740B. The virtual applications 728A and 728B are typically constructed in accordance with the tenant-specific metadata 738A and 738B, which describes the particular tables, reports, interfaces and/or other features of the particular application 728A or 728B. In various implementations, each virtual application 728A or 728B generates dynamic web content that can be served to a browser or other client programs 742A and 742B associated with its client device 740A or 740B, as appropriate.

The runtime application generator 720 suitably interacts with the query generator 714 to efficiently obtain multi-tenant data 732 from the database 730 as needed in response to input queries initiated or otherwise provided by users of the client devices 740A and 740B. In a typical implementation, the query generator 714 considers the identity of the user requesting a particular function (along with the user's associated tenant), and then builds and executes queries to the database 730 using system-wide metadata within a universal data directory (UDD) 736, tenant specific metadata 738A and 738B, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728A or 728B for that user and/or tenant.

Still referring to FIG. 7, the data processing engine 712 performs bulk processing operations on the data 732 such as uploads or downloads, updates, online transaction processing, and/or the like. In many implementations, less urgent bulk processing of the data 732 can be scheduled to occur as processing resources become available, thereby giving priority to more urgent data processing by the query generator 714, the search engine 716, the virtual applications 728A and 728B, etc.

In exemplary implementations, the application platform 710 is utilized to create and/or generate data-driven virtual applications 728A and 728B for the tenants that they support. Such virtual applications 728A and 728B may make use of interface features such as custom (or tenant-specific) screens 724, standard (or universal) screens 722 or the like. Any number of custom and/or standard objects 726 may also be available for integration into tenant-developed virtual applications 728A and 728B. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 732 associated with each virtual application 728A or 728B is provided to the database 730, as appropriate, and stored until it is requested or is otherwise needed, along with the metadata 738A and 738B that describes the particular features (e.g., reports, tables, functions, objects, fields, formulas, code, etc.) of that particular virtual application 728A or 728B. For example, a virtual application 728A or 728B may include a number of objects 726 accessible to a tenant, wherein for each object 726 accessible to the tenant, information pertaining to its object type along with values for various fields associated with that respective object type are maintained as metadata 738A and 738B in the database 730. In this regard, the object type defines the structure (e.g., the formatting, functions and other constructs) of each respective object 726 and the various fields associated therewith.

With continued reference to FIG. 7, the data and services provided by the server 702 can be retrieved using any sort of personal computer, mobile telephone, tablet or other network-enabled client device 740A or 740B on the network 745. In an exemplary implementation, the client device 740A or 740B includes a display device, such as a monitor, screen, or another conventional electronic display capable of graphically presenting data and/or information retrieved from the multi-tenant database 730. Typically, the user operates a conventional browser application or other client program 742A and 742B executed by the client devices 740A and 740B to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728A or 728B, the runtime application generator 720 suitably creates the application at run time based upon the metadata 738A and 738B, as appropriate. As noted above, the virtual application 728A or 728B may contain Java, ActiveX, or other content that can be presented using conventional client software running on the client device 740A or 740B; other implementations may simply provide dynamic web or other content that can be presented and viewed by the user, as desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

Flowcharts

Figure 8:
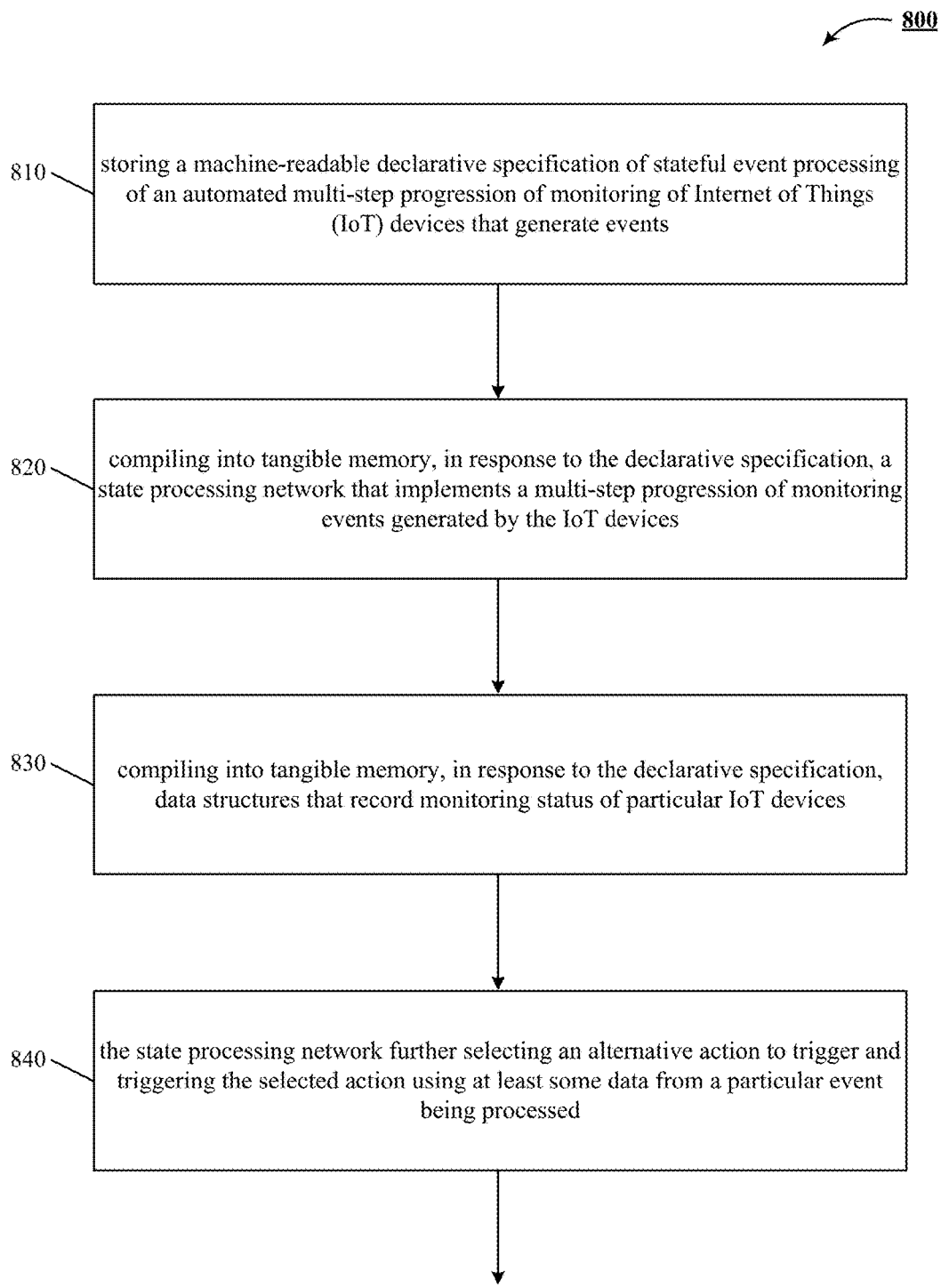
FIG. 8 shows a flowchart of processing events generated by Internet of Things (IoT) devices.

FIG. 8 shows one implementation of a flowchart 800 of processing events generated by Internet of Things (IoT) devices. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this workflow is described with reference to the system that carries out a method. The system is not necessarily part of the method.

At action 810, the method includes storing a machine-readable declarative specification of stateful event processing of an automated multi-step progression of monitoring of Internet of Things (IoT) devices that generate events, as described supra. In one implementation, the declarative specification includes states in the multi-step progression, time based transition triggers, event based transition triggers, definitions of conditions applicable to the event based triggers, and alternative actions responsive to state transitions caused by the time based transition triggers and the event based transition triggers.

At action 820, the method includes compiling into tangible memory, in response to the declarative specification, a state processing network that implements a multi-step progression of monitoring events generated by the IoT devices. In one implementation, the state processing network implements both the time based transition triggers and the event based transition triggers after being initiated by the IoT devices.

At action 830, the method includes compiling into tangible memory, in response to the declarative specification, data structures that record monitoring status of particular IoT devices.

At action 840, the method includes the state processing network further selecting an alternative action to trigger and triggering the selected action using at least some data from a particular event being processed.

Figure 9:
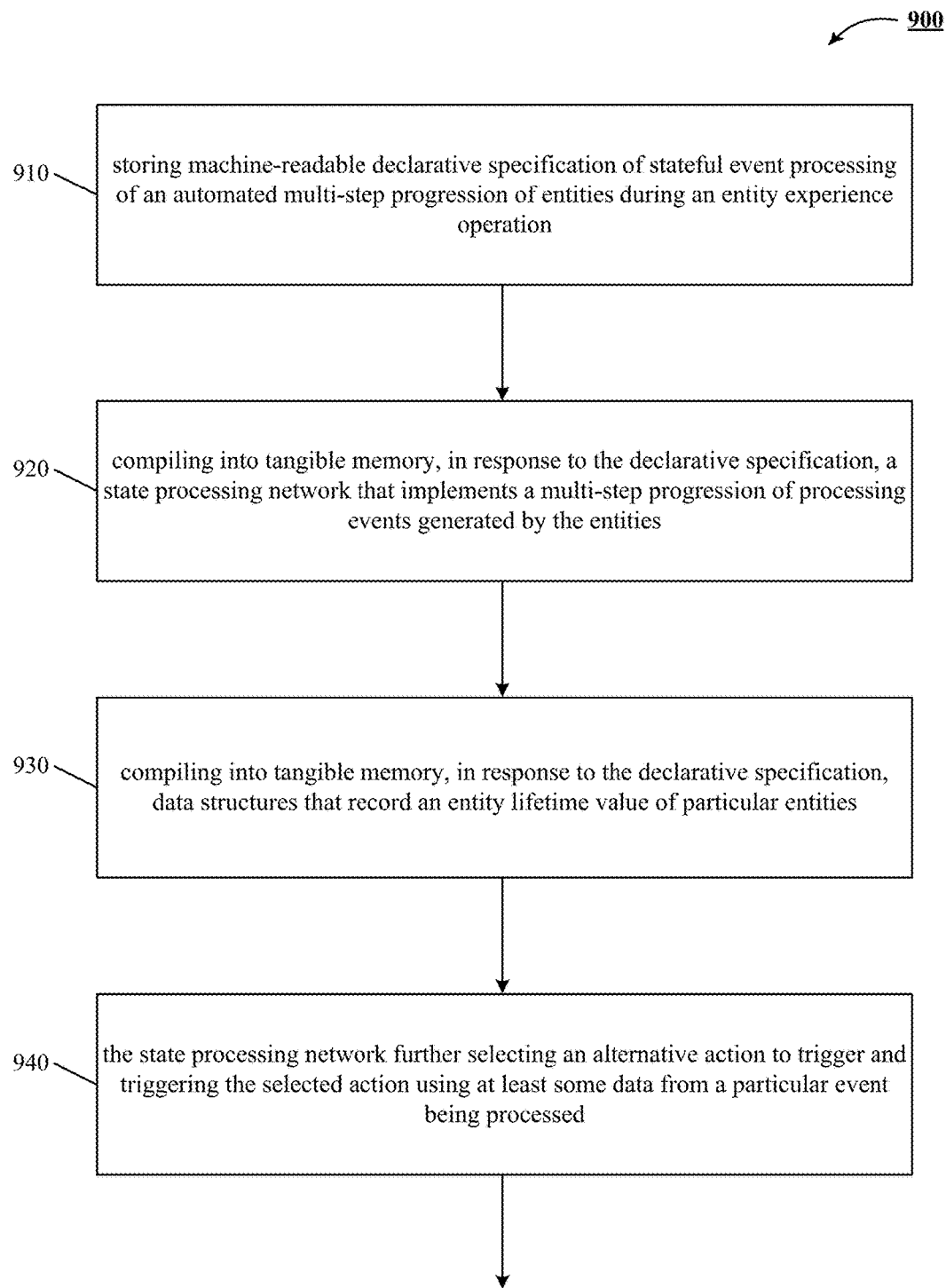
FIG. 9 illustrates a representative method of implementing an entity churn management program.

FIG. 9 shows one implementation of a flowchart 900 of implementing an entity churn management program. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this workflow is described with reference to the system that carries out a method. The system is not necessarily part of the method.

At action 910, the method includes storing machine-readable declarative specification of stateful event processing of an automated multi-step progression of entities during an entity experience operation, as described supra. In one implementation, the declarative specification includes states in the multi-step progression, time based transition triggers, event based transition triggers, definitions of conditions applicable to the event based triggers, and alternative actions responsive to state transitions caused by the time based transition triggers and the event based transition triggers.

At action 920, the method includes compiling into tangible memory, in response to the declarative specification, a state processing network that implements a multi-step progression of processing events generated by the entities. In one implementation, the state processing network implements both the time based transition triggers and the event based transition triggers after being initiated by the entities.

At action 930, the method includes compiling into tangible memory, in response to the declarative specification, data structures that record an entity lifetime value of particular entities.

At action 940, the method includes the state processing network further selecting an alternative action to trigger and triggering the selected action using at least some data from a particular event being processed.

Some Particular Implementations

Some particular implementations and features are described in the following discussion.

In one implementation, described is a method of processing events generated by Internet of Things (IoT) devices. The method includes storing a machine-readable declarative specification of stateful event processing of an automated multi-step progression of monitoring of Internet of Things (IoT) devices that generate events. The declarative specification includes states in the multi-step progression, time based transition triggers, event based transition triggers, definitions of conditions applicable to the event based triggers, and alternative actions responsive to state transitions caused by the time based transition triggers and the event based transition triggers. The method further includes compiling into tangible memory, in response to the declarative specification, a state processing network that implements a multi-step progression of monitoring events generated by the IoT devices. The state processing network implements both the time based transition triggers and the event based transition triggers after being initiated by the IoT devices. Further, data structures, which record monitoring status of particular IoT devices, are compiled. Finally, the state processing network further selects an alternative action to trigger, and triggers the selected action using at least some data from a particular event being processed.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in previous sections of the application.

In one implementation, the state processing network further selects and triggers a global action using at least some data from a particular event being processed.

In one implementation, a particular IoT device is installed with a plurality of other IoT devices under a device deployment scheme. In such an implementation, the method includes compiling data structures corresponding to a first event that indicates a first anomalous performance of the particular IoT device, compiling data structures corresponding to event history indicating various anomalous performances of the other IoT devices at different times, using the state processing network to determine historical frequency of the first anomalous performance among the other IoT devices by applying a definition of a threshold condition to the first event and the event history and to variables derived from the first event and the event history, and using the state processing network to select and trigger a potential mismatch action when the historical frequency meets the threshold condition, wherein the action represents a potential mismatch between the particular and other IoT devices and the device deployment scheme.

In some implementations, the particular IoT device is a smart uninterruptible power supply (UPS) device and the first anomalous performance is spike in power voltage. In one implementation, the event history of the other IoT devices includes surge in power load, swing in power voltage, circuit breaks, spike in power voltage, low battery voltage and battery failure.

In yet other implementations, the method further includes compiling data structures corresponding to a first event that indicates a first anomalous performance of the particular IoT device, compiling data structures corresponding to event history indicating various anomalous performances of the particular IoT device at different times, using the state processing network to determine historical frequency of the first anomalous performance within a predetermined time window by applying a definition of a threshold condition and a time period condition to the first event and the event history and to variables derived from the first event and the event history, and using the state processing network to select and trigger a false positive action when the historical frequency fails to meet the threshold condition and the time period condition.

In one implementation, the particular IoT device is a smart thermostat and the first anomalous performance is low battery voltage. In another implementation, the event history of the other IoT devices includes low connectivity signal, lengthy constant readings, low battery voltage and battery failure.

Other implementations of the method described in this section can include a non-transitory computer readable storage medium storing computer program instructions executable by a processor to perform any of the methods described above. Yet another implementation of the method described in this section can include a system including memory and one or more processors operable to execute instructions, stored in the memory, to perform any of the methods described above.

In another implementation, described is a method of implementing an entity churn management program. The method includes storing machine-readable declarative specification of stateful event processing of an automated multi-step progression of entities during an entity experience operation. The declarative specification includes states in the multi-step progression, time based transition triggers, event based transition triggers, definitions of conditions applicable to the event based triggers, and alternative actions responsive to state transitions caused by the time based transition triggers and the event based transition triggers. The method further includes compiling into tangible memory, in response to the declarative specification, a state processing network that implements a multi-step progression of processing events generated by the entities. The state processing network implements both the time based transition triggers and the event based transition triggers after being initiated by the entities. Further, data structures, which record an entity lifetime value of particular entities, are compiled. Finally, the state processing network further selects an alternative action to trigger, and triggers the selected action using at least some data from a particular event being processed.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in previous sections of the application.

Other implementations of the method described in this section can include a non-transitory computer readable storage medium storing computer program instructions executable by a processor to perform any of the methods described above. Yet another implementation of the method described in this section can include a system including memory and one or more processors operable to execute instructions, stored in the memory, to perform any of the methods described above.

In one implementation, the entity lifetime value for a particular entity is calculated based on events that specify particular entity's revenue generation to date, particular entity's retention characteristics and cost to serve the particular entity.

In another implementation, data structures corresponding to the entity lifetime value further include specification of a number of times a particular entity purchased or renewed an annual subscription, specification of a number of times the particular entity purchased or renewed a monthly subscription, and specification of a number of total days between expiry date and late renewal date during the particular entity's participation in the entity experience operation.

In yet another implementation, data structures corresponding to the entity lifetime value further include specification of whether a particular entity is currently enrolled in an annual automated renewal subscription, specification of whether the particular entity is currently enrolled in a monthly automated renewal subscription, specification of particular entity's activity levels during its participation in the entity experience operation, specification of whether the particular entity converted from a free-trial to a paying entity, and specification of whether the particular entity enrolled in the entity experience operation via an entity handler or another intermediary.

In some implementations, data structures corresponding to the entity lifetime value further include specification of a purchase channel used by a particular entity to enroll in the entity experience operation.

In other implementations, data structures corresponding to the entity lifetime value further include an indication of a particular entity's intention to cancel its enrollment in the entity experience operation.

In a further implementation, the definitions of conditions further include linking a plurality of reasons for entity enrollment cancellation to a plurality of entity states and linking the plurality of entity states to one or more message actions selected and triggered by the state processing network.

In one implementation, multiple entity states are linked to a particular reason for entity enrollment cancellation and multiple message actions are linked to a particular entity state.

In other implementations, the method further includes compiling a data structure corresponding to the entity lifetime value that indicates a particular entity's intention to cancel its enrollment in the entity experience operation and using the state processing network to select and trigger an entity retention action based on the particular entity's state and reason for enrollment cancellation, and retrieving and including in the action targeted content and a first offer for the particular entity.

In yet other implementations, when the particular entity maintains its enrollment cancellation, the method further includes using the state processing network to implement an offer timer that is expired upon particular entity's failure to accept the first offer with a time period and using the state processing network to select and trigger a second offer for the particular entity upon expiration of the offer timer, wherein the second offer is selected and triggered based on particular entity's state and reason for enrollment cancellation.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of processing events generated by Internet of Things (IoT) devices, the method including:
  storing a machine-readable declarative specification of stateful event processing of an automated multi-step progression of monitoring of IoT devices that generate events, wherein the declarative specification includes;
states in the multi-step progression;
time based transition triggers;
event based transition triggers;
definitions of conditions applicable to the event based triggers; and
alternative actions responsive to state transitions caused by the time based transition triggers and the event based transition triggers;
compiling into tangible memory, in response to the declarative specification:
a state processing network that implements the automated multi-step progression of monitoring the events generated by the IoT devices, the time based transition triggers and the event based transition triggers after being initiated by the IoT devices, and a first plurality of data structures that record monitoring status of the IoT devices, wherein the state processing network further selects an alternative action to trigger, and triggers the alternative action using at least some data from a particular event being processed;
compiling a second plurality of data structures corresponding to a first event that indicates a first anomalous performance of a particular IoT device installed with a plurality of other IoT devices under a device deployment scheme;
compiling a third plurality of data structures corresponding to event history indicating various anomalous performances of the plurality of other IoT devices at different times;
using the state processing network to determine historical frequency of the first anomalous performance among the plurality of other IoT devices by applying a definition of a threshold condition to the first event, the event history, and variables derived from the first event and the event history; and
using the state processing network to select and trigger a potential mismatch action when the historical frequency meets the threshold condition, wherein the potential mismatch action represents a potential mismatch between the particular IoT device and the plurality of other IoT devices and the device deployment scheme.

2. The method of claim 1, wherein the state processing network further selects and triggers a global action using the at least some data from the particular event being processed.

3. The method of claim 1, wherein the particular IoT device is a smart uninterruptible power supply (UPS) device and the first anomalous performance is spike in power voltage.

4. The method of claim 1, wherein the event history of the other IoT devices includes a surge in power load, a swing in power voltage, circuit breaks, a spike in power voltage, low battery voltage, or battery failure.

5. The method of claim 1, wherein the historical frequency is a first historical frequency, the definition is a first definition, the event history is first event history, the threshold condition is a first threshold condition, the particular IoT device is a first IoT device, and further including:
compiling a fourth plurality of data structures corresponding to a second event that indicates a second anomalous performance of a second IoT device;
compiling a fifth plurality of data structures corresponding to second event history indicating a plurality of anomalous performances of the second IoT device;
using the state processing network to determine second historical frequency of the second anomalous performance within a predetermined time window by applying a second definition of a second threshold condition and a time period condition to the second event and the second event history and to variables derived from the second event and the second event history; and
using the state processing network to select and trigger a false positive action when the second historical frequency fails to meet the second threshold condition and the time period condition.

6. The method of claim 5, wherein the second IoT device is a smart thermostat and the second anomalous performance is low battery voltage.

7. The method of claim 5, wherein the second event history of the second plurality of IoT devices includes low connectivity signal, lengthy constant readings, low battery voltage, or battery failure.

8. A non-transitory computer readable storage medium impressed with computer program instructions to process events generated by Internet of Things (IoT) devices, the instructions, when executed on a processor, implement a method comprising:
storing a machine-readable declarative specification of stateful event processing of an automated multi-step progression of monitoring of IoT devices that generate events, wherein the declarative specification includes;
states in the multi-step progression;
time based transition triggers;
event based transition triggers;
definitions of conditions applicable to the event based triggers; and
alternative actions responsive to state transitions caused by the time based transition triggers and the event based transition triggers;
compiling into tangible memory, in response to the declarative specification:
a state processing network that implements a multi-step progression of monitoring events generated by the IoT devices, the time based transition triggers and the event based transition triggers after being initiated by the IoT devices, and a first plurality of data structures that record monitoring status of the IoT devices, wherein the state processing network further selects an alternative action to trigger, and triggers the alternative action using at least some data from a particular event being processed;
compiling a second plurality of data structures corresponding to a first event that indicates a first anomalous performance of a particular IoT device;
compiling a third plurality of data structures corresponding to event history indicating various anomalous performances of the particular IoT device at different times;
using the state processing network to determine historical frequency of the first anomalous performance within a predetermined time window by applying a definition of a threshold condition and a time period condition to the first event and the event history and to variables derived from the first event and the event history; and
using the state processing network to select and trigger a false positive action when the historical frequency fails to meet the threshold condition and the time period condition.

9. The non-transitory computer readable storage medium of claim 8, wherein the state processing network further selects and triggers a global action using the at least some data from the particular event being processed.

10. The non-transitory computer readable storage medium of claim 8, wherein the particular IoT device is a first IoT device, the historical frequency is a first historical frequency, the definition is a first definition, the threshold condition is a first threshold condition, the event history is first event history, implementing the method further comprising:

compiling a fourth plurality of data structures corresponding to a second event that indicates a second anomalous performance of a second IoT device installed with a second plurality of IoT devices under a second device deployment scheme;

compiling a fifth plurality of data structures corresponding to second event history indicating various anomalous performances of a second plurality of IoT devices;

using the state processing network to determine second historical frequency of the second anomalous performance among the second plurality of IoT devices by applying a second definition of a second threshold condition to the second event and the second event history and to variables derived from the second event and the second event history; and using the state processing network to select and trigger a potential mismatch action when the second historical frequency meets the second threshold condition, wherein the potential mismatch action represents a potential mismatch between the second IoT device and the second plurality of IoT devices and the second device deployment scheme.

11. The non-transitory computer readable storage medium of claim 10, wherein the second IoT device is a smart uninterruptible power supply (UPS) device and the second anomalous performance is spike in power voltage.

12. The non-transitory computer readable storage medium of claim 10,
wherein the second event history of the plurality of other IoT devices includes a surge in power load, a swing in power voltage, circuit breaks, a spike in power voltage, low battery voltage, or battery failure.

13. The non-transitory computer readable storage medium of claim 8, wherein the particular IoT device is a smart thermostat and the first anomalous performance is low battery voltage.

14. The non-transitory computer readable storage medium of claim 8, wherein the event history of the plurality of other IoT devices includes low connectivity signal, lengthy constant readings, low battery voltage, or battery failure.

15. A system including one or more processors coupled to memory, the memory loaded with computer instructions to process events generated by Internet of Things (IoT) devices, the instructions, when executed on the processors, implement actions comprising:

storing a machine-readable declarative specification of stateful event processing of an automated multi-step progression of monitoring of Internet of Things (IoT) devices that generate events, wherein the declarative specification includes;

states in the multi-step progression;
time based transition triggers;
event based transition triggers;
definitions of conditions applicable to the event based triggers; and alternative actions responsive to state transitions caused by the time based transition triggers and the event based transition triggers;

compiling into tangible memory, in response to the declarative specification:
a state processing network that implements a multi-step progression of monitoring events generated by the IoT devices, the time based transition triggers and the event based transition triggers after being initiated by the IoT devices, and a first plurality of data structures that record monitoring status of the IoT devices; and
wherein the state processing network further selects an alternative action to trigger, and triggers the alternative action using at least some data from a particular event being processed;

compiling a second plurality of data structures corresponding to a first event that indicates a first anomalous performance of the particular IoT device;

compiling a third plurality of data structures corresponding to event history indicating various anomalous performances of the particular IoT device at different times;

using the state processing network to determine historical frequency of the first anomalous performance within a predetermined time window by applying a definition of a threshold condition and a time period condition to the first event and the event history and to variables derived from the first event and the event history; and using the state processing network to select and trigger a false positive action when the historical frequency fails to meet the threshold condition and the time period condition.

16. The system of claim 15, wherein the state processing network further selects and triggers a global action using the at least some data from the particular event being processed.

17. The system of claim 15, wherein the particular IoT device is a first IoT device, the historical frequency is a first historical frequency, the definition is a first definition, the threshold condition is a first threshold condition, the event history is first event history, further implementing actions comprising:

compiling a fourth plurality of data structures corresponding to a second event that indicates a second anomalous performance of a second IoT device installed with a plurality of IoT devices under a second device deployment scheme;

compiling a fifth plurality of data structures corresponding to second event history indicating various anomalous performances of the plurality of IoT devices;

using the state processing network to determine a second historical frequency of the second anomalous performance among the plurality of IoT devices by applying a second definition of a second threshold condition to the second event and the second event history and to variables derived from the second event and the second event history; and using the state processing network to select and trigger a potential mismatch action when the second historical frequency meets the second threshold condition, wherein the potential mismatch action represents a potential mismatch between the second IoT device and the plurality of IoT devices and the second device deployment scheme.

* * * * *